US012463151B2

(12) United States Patent
Chang et al.

(10) Patent No.: US 12,463,151 B2
(45) Date of Patent: *Nov. 4, 2025

(54) PUF MEMORY DEVICES AND METHODS OF MANUFACTURING THEREOF

(71) Applicant: Taiwan Semiconductor Manufacturing Company, Ltd., Hsinchu (TW)

(72) Inventors: Meng-Sheng Chang, Hsinchu (TW); Yih Wang, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 127 days.

This patent is subject to a terminal disclaimer.

(21) Appl. No.: 18/405,926

(22) Filed: Jan. 5, 2024

(65) Prior Publication Data

US 2025/0062251 A1 Feb. 20, 2025

Related U.S. Application Data

(60) Provisional application No. 63/609,651, filed on Dec. 13, 2023, provisional application No. 63/519,401, filed on Aug. 14, 2023.

(51) Int. Cl.
*G11C 17/00* (2006.01)
*G11C 17/16* (2006.01)
(Continued)

(52) U.S. Cl.
CPC ............ *H01L 23/573* (2013.01); *G11C 17/16* (2013.01); *G11C 17/18* (2013.01); *H10B 20/25* (2023.02)

(58) Field of Classification Search
CPC ....... H01L 23/573; H10B 20/25; G11C 17/16; G11C 17/18
See application file for complete search history.

(56) References Cited

U.S. PATENT DOCUMENTS 8,525,169 B1 * 9/2013 Edelstein ............ H01L 23/5226
365/46
10,623,192 B2 * 4/2020 Wang .................... H04L 9/3278
(Continued)

FOREIGN PATENT DOCUMENTS

KR 20250043301 A * 3/2025 ............. G11C 17/16
TW 202245152 A 11/2022
(Continued)

OTHER PUBLICATIONS

Office Action issued in Taiwan Appl. No. 113118002 dated Mar. 25, 2025.

*Primary Examiner* — Viet Q Nguyen
(74) *Attorney, Agent, or Firm* — FOLEY & LARDNER LLP

(57) ABSTRACT

A memory device includes an array comprising a plurality of one-time-programmable (OTP) memory cells; a plurality of word lines (WLs); a plurality of bit lines (BLs); and a plurality of control gate (CG) lines. Each of the OTP memory cells comprises a first fuse resistor, a second fuse resistor, a first transistor, and a second transistor. The first fuse resistor and the second fuse resistor are coupled to a corresponding one of the BLs, while the first transistor and the second transistor are gated by a first one and a second one of the CG lines, respectively.

20 Claims, 21 Drawing Sheets

(51) Int. Cl.
*G11C 17/18* (2006.01)
*H01L 23/00* (2006.01)
*H10B 20/25* (2023.01)

(56) References Cited

U.S. PATENT DOCUMENTS

| | | | | |
|---|---|---|---|---|
| 10,839,872 | B2 * | 11/2020 | Hsu | G11C 17/18 |
| 11,094,387 | B2 * | 8/2021 | Chang | G11C 17/18 |
| 11,164,647 | B2 * | 11/2021 | Denorme | H10B 20/27 |
| 11,243,063 | B2 * | 2/2022 | Leobandung | G03F 7/70633 |
| 11,587,890 | B2 * | 2/2023 | Plouchart | G06F 21/87 |
| 12,198,760 | B2 * | 1/2025 | Nazarian | G11C 13/003 |
| 12,198,785 | B1 * | 1/2025 | Chang | H10D 62/121 |
| 12,277,990 | B2 * | 4/2025 | Chang | G11C 8/08 |
| 2020/0227103 | A1 | 7/2020 | Shao | |
| 2023/0162772 | A1 * | 5/2023 | Chao | G11C 17/16 |
| | | | | 365/96 |
| 2023/0180483 | A1 * | 6/2023 | Sharma | G11C 11/221 |
| | | | | 257/295 |
| 2025/0105173 | A1 * | 3/2025 | Chang | H10B 20/25 |

FOREIGN PATENT DOCUMENTS

| | | | |
|---|---|---|---|
| TW | 202316425 A | 4/2023 | |
| TW | 202333147 A * | 8/2023 | G11C 11/40 |

* cited by examiner

PUF MEMORY DEVICES AND METHODS OF MANUFACTURING THEREOF

CROSS-REFERENCE TO RELATED APPLICATION

This application claims priority to and the benefit of both of U.S. Provisional Application No. 63/519,401, filed Aug. 14, 2023, and U.S. Provisional Application No. 63/609,651, filed Dec. 13, 2023, both of which are incorporated herein by reference in their entireties for all purposes.

BACKGROUND

A one-time-programmable (OTP) memory device is one type of the non-volatile memory device utilized in integrated circuits for adjusting the circuitry after fabrication of an integrated circuit. For example, the OTP memory device is used for providing repair information that controls the usage of redundant cells in replacing defective cells of a memory array. Another use is for tuning analog circuitry by trimming a capacitive or resistive value of an analog circuit or enabling and disabling portions of the system. A recent trend is that the same product is likely to be manufactured in different fabrication facilities though in a common process technology. Despite best engineering efforts, it is likely that each facility will have a slightly different process. Usage of OTP memory devices allows independent optimization of the product functionality for each manufacturing facility.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
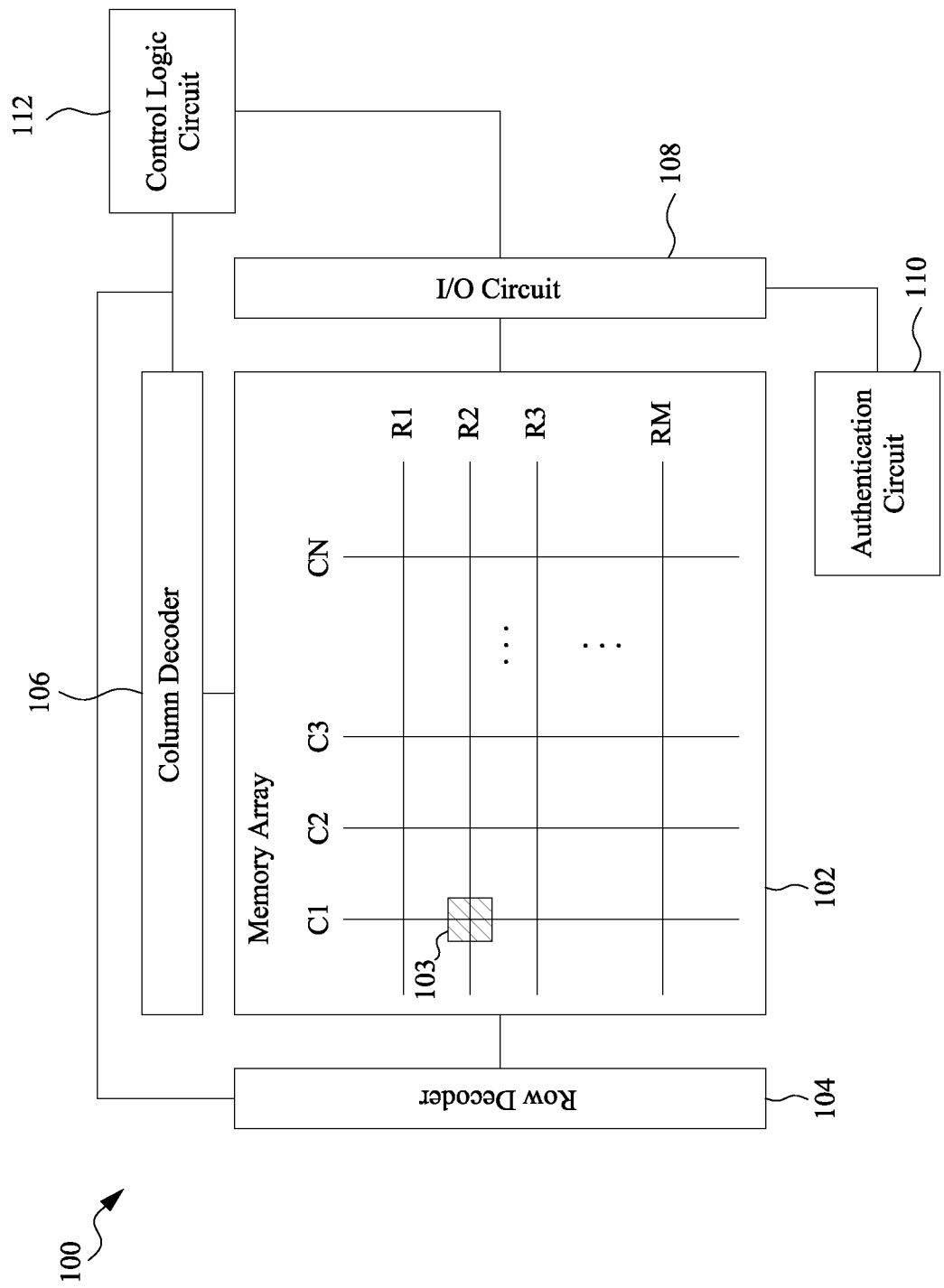
FIG. 1 illustrates a block diagram of an example memory system including a memory array, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A physically unclonable function (PUF) is generally used for authentication and secret key storage without requiring secure electrically erasable programmable read-only memory (EEPROMs) and/or other expensive hardware (e.g., battery-backed static random-access memory). Instead of storing secrets in a digital memory, the PUF derives a secret from physical characteristics of an integrated circuit (IC). The PUF is based on an idea that even though an identical manufacturing process is used to fabricate a number of ICs, each IC may be slightly different from one another due to manufacturing variability. PUFs leverage this variability to derive "secret" information that is unique to each of the ICs (e.g., a silicon biometric). Generally, such secret information is referred to as a "PUF signature" of the IC. In addition, due to the manufacturing variability that defines the PUF signature, one cannot manufacture two identical ICs even with full knowledge of the IC's design. Various types of variability of an IC can be used to define such a signature such as, for example, gate delay(s), power-on state(s) of a memory device, and/or any of a variety of physical characteristics of an IC.

Embodiments of the present disclosure provide various systems and methods to generate, at least, a bit of a PUF signature (sometimes referred to as a PUF bit) for/from a memory device that includes a number of memory cells. In one aspect of the present disclosure, each of the memory cells is implemented as an efuse cell that includes multiple transistors and two fuse resistors (sometimes referred to as "mT2R structure"). The two fuse resistors each have one end commonly connected to a bit line, through which a programming voltage is applied. Even though the pair of fuse resistors are formed in the same dimensions and the same material, while being concurrently with the same level of a programming voltage, one of the fuse resistors can precede the other to be blown (or burned) by the programming voltage, according to various embodiments. As such, one of these two fuse resistors can be randomly (and precedingly) programmed to equivalently form an open circuit, while the other remains as a short circuit. According to which of the fuse resistors is broken down first, the disclosed system (e.g., integrated with the memory device) can generate one PUF bit for/from the memory device. Applying the same principle over all of the memory cells, the disclosed system can generate a unique PUF signature from such a memory device.

FIG. 1 illustrates a block diagram of a memory system 100, in accordance with various embodiments. In the illustrated embodiment of FIG. 1, the memory system 100 includes a memory array 102, a row decoder 104, a column decoder 106, an input/output (I/O) circuit 108, an authentication circuit 110, and a control logic circuit 112. Despite not being shown in FIG. 1, all of the components of the memory system 100 may be coupled to each other and to the control logic circuit 112. Although, in the illustrated embodiment of FIG. 1, each component is shown as a separate block for the purpose of clear illustration, in some other embodiments, some or all of the components shown in FIG. 1 may be integrated together. For example, the memory array 102 may include an embedded authentication circuit (e.g., 110).

The memory array 102 is a hardware component that stores data. In various embodiments, the memory array 102 is embodied as a semiconductor memory device. The memory array 102 includes a plurality of memory cells (or otherwise storage units) 103. The memory array 102 includes a number of rows $R_1, R_2, R_3 \ldots R_M$, each extending in a first direction (e.g., X-direction) and a number of columns $C_1, C_2, C_3 \ldots C_N$, each extending in a second direction (e.g., Y-direction). Each of the rows and columns may include one or more conductive (e.g., metal) structures that function as access lines. Each memory cell 103 is arranged in the intersection of a corresponding row and a corresponding column, and can be operated according to voltages or currents through the respective conductive structures of the column and row. For example, each of the rows may include a corresponding word line (WL), and each of the columns may include a corresponding bit line (BL) and multiple corresponding control gate (CG) lines.

In some embodiments, each memory cell 103 is embodied as an efuse memory cell that may include a first fuse resistor, a second fuse resistor, a first control/cascode gate (CG) selector/transistor, a second CG selector/transistor, and one or more WL selectors/transistors. The first fuse resistor, the first CG transistor, and at least one of the WL transistors are coupled to each other in series, and the second fuse resistor, the second CG transistor, and at least one of the WL transistors are coupled to each other in series. Further, a corresponding WL can be connected to respective gate(s) of the one or more WL transistors, a corresponding BL can be connected to respective ends of the first and second fuse resistors, a corresponding first CG line can be connected to a gate of the first CG transistor, and a corresponding second CG line can be connected to a gate of the second CG transistor, which will be discussed in further detail with respect to FIGS. 2 and 3.

Although, in various embodiments of the present disclosure, the memory cell 103 is implemented as an efuse memory cell that includes a number of fuse resistors each formed as a metal track in a corresponding metallization layer, the fuse resistors of the memory cell 103 may be implemented based on other resistor-based memory configurations. For example, the memory cell 103 may be formed as a Resistive Random Access Memory (RRAM) configuration, a Phase Change Random Access Memory (PCRAM or PRAM) configuration, or a Magnetoresistive Random Access Memory (MRAM) configuration. In some other embodiments, the fuse resistors of the memory cell 103 may be implemented based on via structures or polysilicon structures. Further, in some other embodiments, the memory cell 103 may be implemented as an efuse memory cell that includes a number of fuse capacitors, in which the fuse capacitors may each be formed as a metal-insulator-metal (MIM) capacitor or a metal-oxide-metal (MOM) capacitor.

In brief overview, the one or more WL transistors and both of the first and second CG transistors can be turned on to program the respective first and second fuse resistors. For example, upon being turned on through the respective WL line, first CG line, and second CG line, those two fuse resistors can be programmed at the same time by applying a same programming voltage on the BL. Randomly, one of the first and second fuse resistors can be blown faster than the other, and consequently, a logic state of the memory cell can be determined, according to which of the two fuse resistors has been blown. Such randomly programmed logic states of the memory cells can constitute the basis of a PUF signature. Detailed descriptions on configurations and operations of the memory cell 103 and its application to generate a PUF signature will be discussed below with respect to FIGS. 4, 5, and 6.

The row decoder 104 is a hardware component that can receive a row address of the memory array 102 and assert a conductive structure (e.g., the WL) at that row address. The column decoder 106 is a hardware component that can receive a column address of the memory array 102 and assert a number of conductive structures (e.g., the BL and one or more of the CG lines) at that column address. The I/O circuit 108 is a hardware component that can access (e.g., read, program) each of the memory cells 103 asserted through the row decoder 104 and column decoder 106. The authentication circuit 110 is a hardware component that can generate a PUF signature based on respective logic states of the memory cells read by the I/O circuit 108. The control logic circuit 112 is a hardware component that can control the coupled components (e.g., 102 through 110). Detailed descriptions on configurations and operations of memory system 100 are provided below with respect to the flow chart of FIG. 20.

Figure 2:
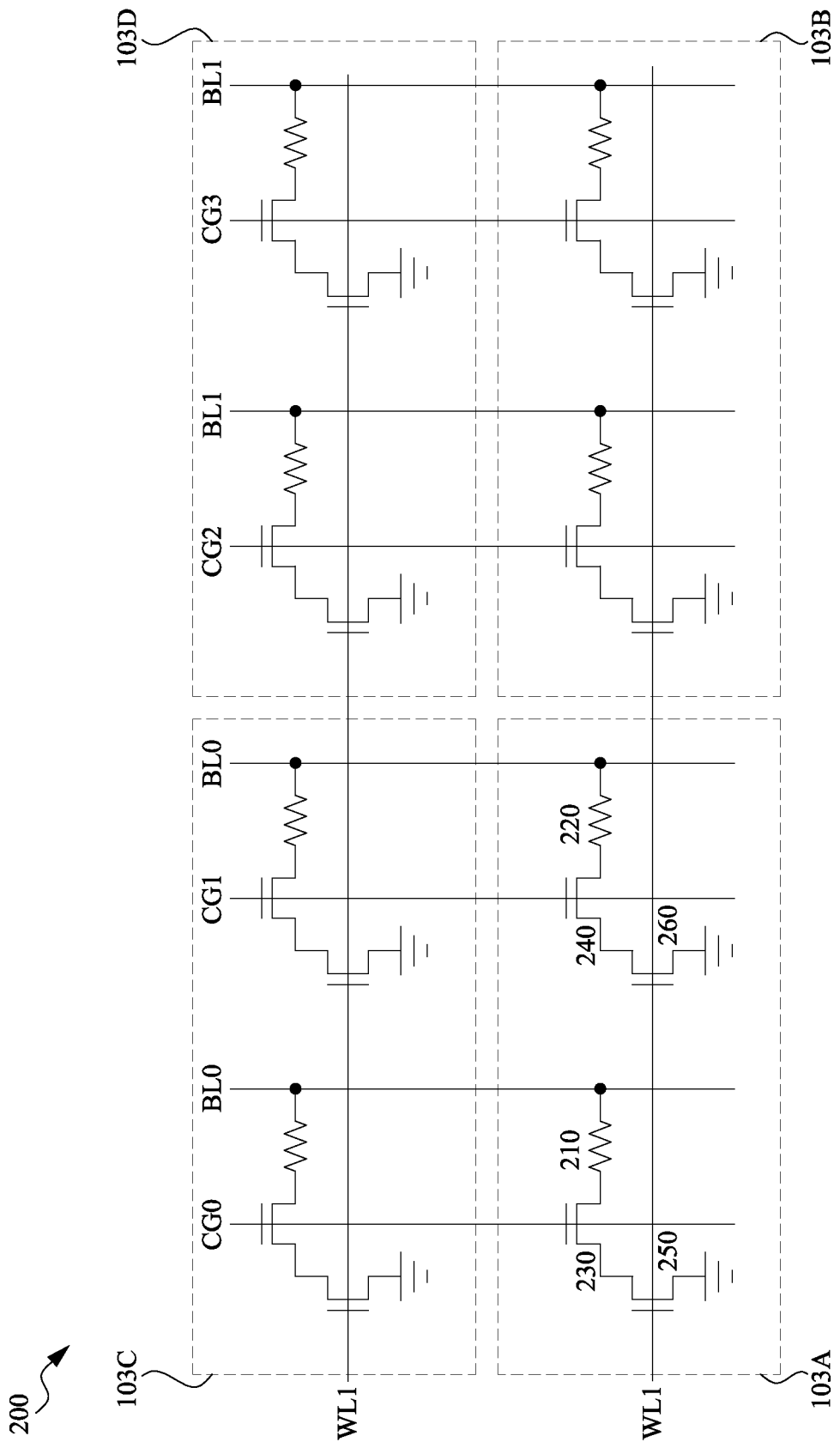
FIG. 2 illustrates an example schematic diagram of a portion of the memory array of FIG. 1 that include a number of memory cells, in accordance with some embodiments.
Figure 3:
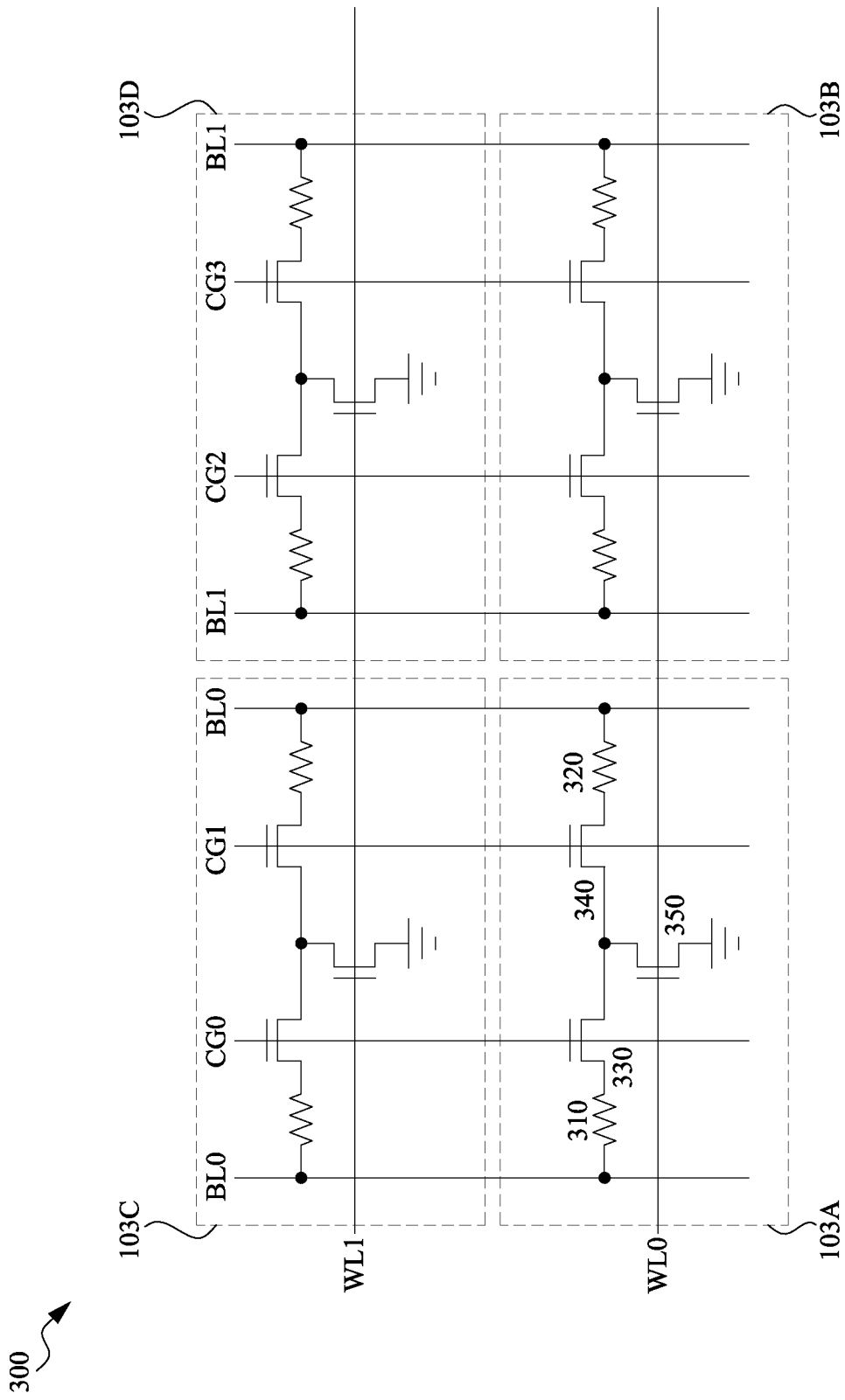
FIG. 3 illustrates another example schematic diagram of a portion of the memory array of FIG. 1 that include a number of memory cells, in accordance with some embodiments.

FIGS. 2 and 3 respectively illustrate example schematic diagrams 200 and 300 of a portion of the memory device 100 (e.g., some of the memory cells 103), in accordance with some embodiments. In the illustrated examples of FIGS. 2-3, efuse memory cells 103A, 103B, 103C, and 103D of the memory array 102 are shown, and each of the efuse memory cells 103A-D includes at least two fuse resistors. Although four efuse memory cells 103A-D are shown, it should be appreciated that the memory array 102 can have any number of similar efuse memory cells, while remaining within the scope of present disclosure.

The memory cells 103 can be arranged as an array (as indicted above in FIG. 1). In FIGS. 2-3, the memory cells 103A and 103B may be disposed in a same row but in respectively different columns; and the memory cells 103C and 103D may be disposed in a same row but in respectively different columns. For example, the memory cells 103A and 103B are disposed in row $R_0$, but in columns $C_0$ and $C_1$, respectively; and the memory cells 103C and 103D are disposed in row $R_1$ but in columns $C_0$ and $C_1$, respectively. With such a configuration, each of the memory cells can be operatively coupled to the access lines in the corresponding row and column, respectively. In various embodiments, along each row, a number of efuse memory cells 103 is coupled to a corresponding WL; and along each column, a number of efuse memory cells 103 is coupled to a corresponding BL and a number of corresponding CG lines. For example, the efuse memory cells 103A and 103B are coupled to $WL_0$ disposed in row $R_0$, and coupled to $BL_0$, $CG_0$, $CG_1$ disposed in column $C_0$ and $BL_1$, $CG_2$, $CG_3$ disposed in column $C_1$, respectively; and the efuse memory cells 103C and 103D are coupled to $WL_1$ disposed in row $R_1$, and coupled to $BL_0$, $CG_0$, $CG_1$ disposed in column $C_0$ and $BL_1$, $CG_2$, $CG_3$ disposed in column $C_1$, respectively.

In some embodiments, the efuse memory cells 103 can include a first fuse resistor, a second fuse resistor, a first CG transistor, a second CG transistor, a first WL transistor, and a second WL transistor, in which the first CG transistor and the second CG transistor have their source/drain terminals coupled to ground through the first WL transistor and the second WL transistor, respectively, as shown in the illustrative example of FIG. 2. In some other embodiments, the efuse memory cells 103 can include a first fuse resistor, a second fuse resistor, a first CG transistor, a second CG transistor, and a common WL transistor, in which the first CG transistor and the second CG transistor have their source/drain terminals coupled to ground through the common WL transistor, as shown in the illustrative example of FIG. 3.

Referring first to the schematic diagram 200 of FIG. 2, each of the efuse memory cells 103A to 103D includes a first fuse resistor 210, a second fuse resistor 220, a first CG transistor 230, a second CG transistor 240, a first WL transistor 250, and a second WL transistor 260. Such a schematic design in FIG. 2 is sometimes referred to as 4-transistor-2-resistor (4T2R) configuration. The first CG transistor 230, the second CG transistor 240, the first WL transistor 250, and the second WL transistor 260 are each implemented as an n-type transistor. However, it should be understood that each of these transistors can be implemented as a p-type transistor, while remaining within the scope of the present disclosure. The first fuse resistor 210, the first CG transistor 230, and the first WL transistor 250 are connected to each other in series between the $BL_0$ and ground; and the second fuse resistor 220, the second CG transistor 240, and the second WL transistor 260 are also connected to each other in series between the $BL_0$ and ground.

Using the efuse memory cell 103A as a representative example, the first fuse resistor 210 has a first end (or terminal) connected to the $BL_0$ and a second end (or terminal) connected to a first source/drain terminal of the first CG transistor 230; the second fuse resistor 220 has a first end (or terminal) also connected to the $BL_0$ and a second end (or terminal) connected to a first source/drain terminal of the second CG transistor 240; the first CG transistor 230 has a second source/drain terminal connected to a first source/drain terminal of the first WL transistor 250, with a second source/drain terminal of the first WL transistor 250 connected to ground; and the second CG transistor 240 has a second source/drain terminal connected to a first source/drain terminal of the second WL transistor 260, with a second source/drain terminal of the second WL transistor 260 connected to ground. Further, the first WL transistor 250 and second WL transistor 260 have their respective gate terminals commonly connected to the $WL_0$ (i.e., commonly gated by the $WL_0$); the first CG transistor 230 has a gate terminal connected to the $CG_0$ (i.e., gated by the $CG_0$); and the second CG transistor 240 has a gate terminal connected to the $CG_1$ (i.e., gated by the $CG_1$).

Referring next to the schematic diagram 300 of FIG. 3, each of the efuse memory cells 103A to 103D includes a first fuse resistor 310, a second fuse resistor 320, a first CG transistor 330, a second CG transistor 340, and a common WL transistor 350. Such a schematic design in FIG. 3 is sometimes referred to as 3-transistor-2-resistor (3T2R) configuration. The first CG transistor 330, the second CG transistor 340, and the WL transistor 350 are each implemented as an n-type transistor. However, it should be understood that each of these transistors can be implemented as a p-type transistor, while remaining within the scope of the present disclosure. The first fuse resistor 310, the first CG transistor 330, and the WL transistor 350 are connected to each other in series between the $BL_0$ and ground; and the second fuse resistor 320, the second CG transistor 340, and the WL transistor 350 are also connected to each other in series between the $BL_0$ and ground.

Using the efuse memory cell 103A as a representative example, the first fuse resistor 310 has a first end (or terminal) connected to the $BL_0$ and a second end (or terminal) connected to a first source/drain terminal of the first CG transistor 330; the second fuse resistor 320 has a first end (or terminal) also connected to the $BL_0$ and a second end (or terminal) connected to a first source/drain terminal of the second CG transistor 340; and the first CG transistor 330 and the second CG transistor 340 each have a second source/drain terminal connected to a first source/drain terminal of the WL transistor 350, with a second source/drain terminal of the WL transistor 350 connected to ground. Further, the WL transistor 350 has its gate terminal connected to the $WL_0$ (i.e., commonly gated by the $WL_0$); the first CG transistor 330 has a gate terminal connected to the $CG_0$ (i.e., gated by the $CG_0$); and the second CG transistor 340 has a gate terminal connected to the $CG_1$ (i.e., gated by the $CG_1$).

To program the efuse memory cell 103, the corresponding WL transistor(s), and first and second CG transistors are first activated. In the example where these transistors are each implemented as an n-type transistor, the WL transistor(s), and first and second CG transistors are activated (e.g., turned on) by applying a signal at a logic high state to each of the WL and CG lines. Next, a programming signal (e.g., voltage) is applied on the BL. With the WL transistor and both of the first and second CG transistors (and the corresponding WL transistor(s)) being turned on, the programming voltage can be applied across each of the first and second fuse resistors. Alternatively stated, two conduction paths are available through at least the first fuse resistor and the second fuse resistor, respectively.

Due to processing variability, even though those two fuse resistors are formed of the same materials and made in identical dimensions, one of the two fuse resistors will be blown faster than the other. For example, once one of the fuse resistors is blown (e.g., one of the fuse resistors becoming an open circuit and the other remaining as a short circuit), a sudden decrease of voltage can be present on the BL, which can automatically stop the programming process on the efuse memory cell 103. As a result, the efuse memory cell 103 can be "randomly" programmed to a first logic state or a second logic state. Whether the first or second logic state is programmed into the memory cell can correspond to which of the fuse resistors is blown (earlier than the other), which may be determined based on a reading process.

To read the efuse memory cell 103, the corresponding WL transistor(s), and only one of the first or second CG transistor are first activated (e.g., turned on). In some embodiments, which of the CG transistor is selected to be activated is fixed across the whole memory array. For example, across all the columns of a memory array, one of the even-numbered CG line (e.g., $CG_0$) or odd-numbered CG line (e.g., $CG_1$) is activated during the reading process. Next, a reading signal (e.g., voltage) is applied on the BL. As one of the fuse resistors has been randomly programmed (blown), only one conduction path can be established from the BL, through the fuse resistor that has not been blown and the selected (activated) CG transistor, and to ground. On the other hand, no conduction path can be established from the BL, through the blown fuse resistor and the selected (activated) CG transistor, and to ground. For example, if the selected CG transistor is connected to the blown fuse resistor, a conduction path will not be established; and if the selected CG transistor is connected to the fuse resistor that has not been blown, a conduction path will be established.

In some embodiments, without a conduction path being established (i.e., the fuse resistor connected to the selected CG transistor has been blown), the efuse memory cell 103 is determined to be at a first logic state (e.g., a logic 1); and with a conduction path being established (i.e., the fuse resistor connected to the selected CG transistor has not been blown), the efuse memory cell 103 is determined to be at a second logic state (e.g., a logic 0). Stated another way, each of the efuse memory cells 103 can be randomly programmed into a logic 1 or 0. Based on such a randomly programmed logic state on each of the efuse memory cells, a PUF signature (formed of respective PUF bits of the efuse memory cells) can be generated.

Figure 4:
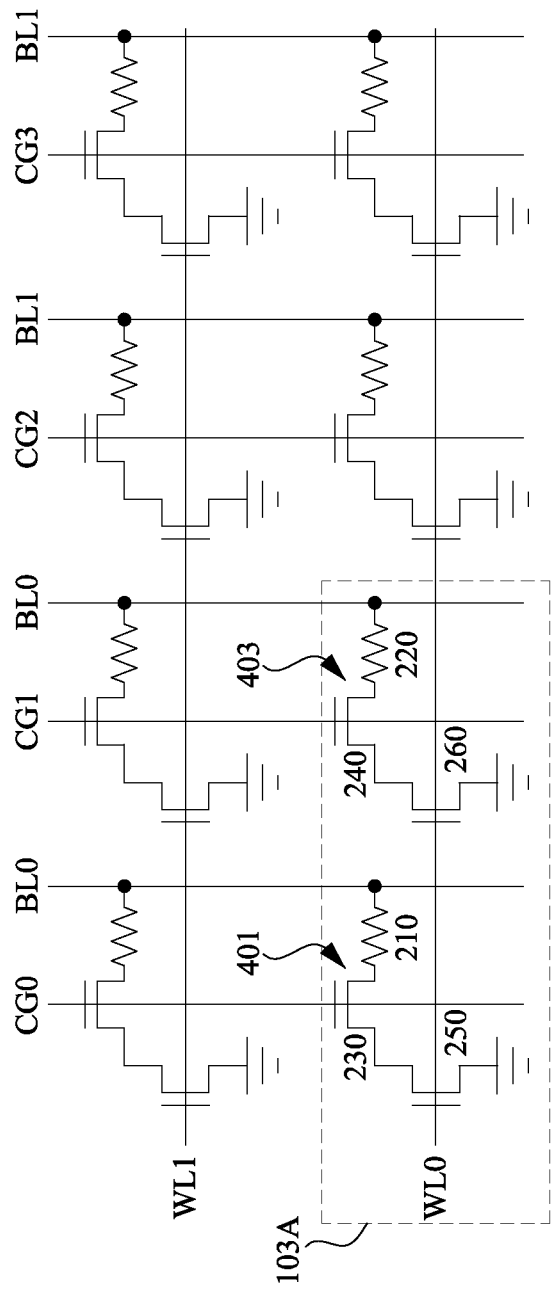
FIGS. 4 and 5 illustrate examples where two memory cells shown in FIG. 2 are respectively programmed, in accordance with some embodiments.
Figure 5:
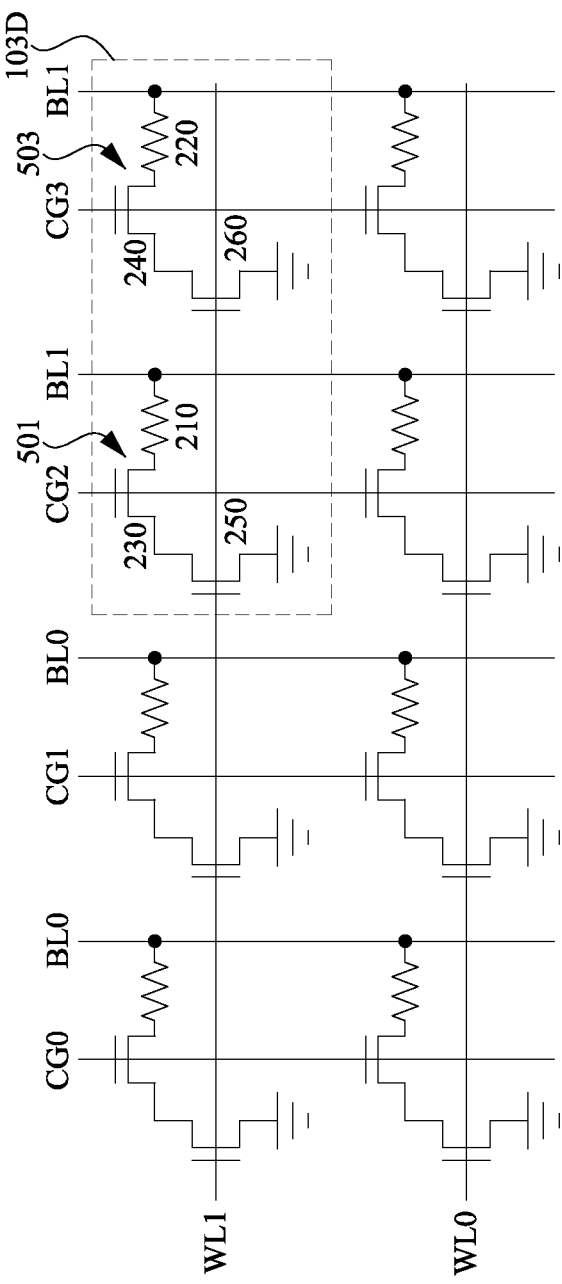

FIGS. 4 and 5 illustrate an example where the efuse memory cells 103A and 103D are sequentially programmed, in accordance with some embodiments. Following the principles discussed above, the efuse memory cells 103A and 103D can each be randomly programmed into a first logic state (e.g., logic 1 with a blown fuse resistor) or a second logic state (e.g., logic 0 with an intact fuse resistor). The numerical values of signals discussed below are merely provided for illustrative purposes, and thus, other values can be contemplated while remaining within the scope of the present disclosure.

Referring first to FIG. 4, to program the efuse memory cell 103A, the $WL_0$ is asserted through applying a voltage signal corresponding to a logic high state (e.g., about 0.75V), while other word lines (e.g., $WL_1$) are each applied with a voltage signal corresponding to a logic low state (e.g., about 0V). Concurrently or subsequently, the $CG_0$ and $CG_1$ are also asserted through applying a voltage signal that is also about 0.75V, while other control gate lines (e.g., $CG_2$ and $CG_3$) are each applied with a voltage signal that is about 0V. As such, the WL transistors 250 and 260 and the CG transistors 230 and 240 of the efuse memory cell 103A can be turned on, and the WL transistors and CG transistors of other efuse memory cells remain deactivated. Next, a programming voltage (e.g., about 1.2~1.5V) is applied on the $BL_0$, while other bit lines (e.g., $BL_1$) are each applied with a voltage signal that is about 0V. Consequently, two conduction paths 401 and 403 are available to conduct current from the $BL_0$ to ground. As discussed above, one of the fuse resistors (e.g., 210) will be blown earlier than the other (e.g., 220). The voltage present on the $BL_0$ can thus suddenly drop, which causes the programming process (e.g., on the still intact fuse resistor 220) to be stopped.

Referring next to FIG. 5, to program the efuse memory cell 103D, the $WL_1$ is asserted through applying a voltage signal corresponding to a logic high state (e.g., about 0.75V), while other word lines (e.g., $WL_0$) are each applied with a voltage signal corresponding to a logic low state (e.g., about 0V). Concurrently or subsequently, the $CG_2$ and $CG_3$ are also asserted through applying a voltage signal that is also about 0.75V, while other control gate lines (e.g., $CG_0$ and $CG_1$) are each applied with a voltage signal that is about 0V. As such, the WL transistors 250 and 260 and the CG transistors 230 and 240 of the efuse memory cell 103D can be turned on, and the WL transistors and CG transistors of other efuse memory cells remain deactivated. Next, a programming voltage (e.g., about 1.2~1.5V) is applied on the $BL_1$, while other bit lines (e.g., $BL_0$) are each applied with a voltage signal that is about 0V. Consequently, two conduction paths 501 and 503 are available to conduct current from the $BL_1$ to ground. As discussed above, one of the fuse resistors (e.g., 220) will be blown earlier than the other (e.g., 210). The voltage present on the $BL_1$ can thus suddenly drop, which causes the programming process (e.g., on the still intact fuse resistor 210) to be stopped.

Figure 6:
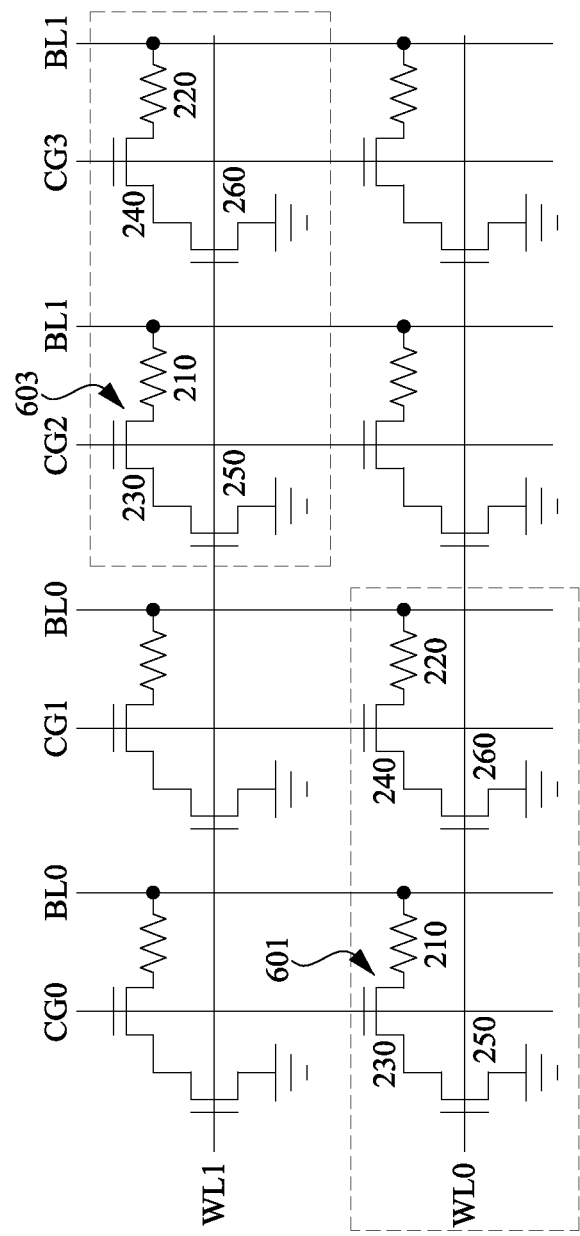
FIG. 6 illustrates an example where two memory cells shown in FIG. 2 are respectively read, in accordance with some embodiments.

FIG. 6 illustrates an example where the efuse memory cells 103A and 103D (after being programmed) are sequentially read, in accordance with some embodiments. Following the example discussed in FIGS. 4-5, the efuse memory cell 103A may have its fuse resistor 210 blown and the efuse memory cell 103A may have its fuse resistor 220 blown. The numerical values of signals discussed below are merely provided for illustrative purposes, and thus, other values can be contemplated while remaining within the scope of the present disclosure.

To program the efuse memory cell 103A, the $WL_0$ is asserted through applying a voltage signal corresponding to a logic high state (e.g., about 0.75V), while other word lines (e.g., $WL_1$) are each applied with a voltage signal corresponding to a logic low state (e.g., about 0V). Concurrently or subsequently, one of the $CG_0$ or $CG_1$ (e.g., $CG_0$) is asserted through applying a voltage signal that is also about 0.75V, while other control gate lines (e.g., $CG_1$, $CG_2$ and $CG_3$) are each applied with a voltage signal that is about 0V As such, the WL transistors 250 and 260 and the CG transistor 230 of the efuse memory cell 103A can be turned on, and the CG transistor 240 of the efuse memory cell 103A, the WL transistors and CG transistors of other efuse memory cells remain deactivated. Next, a reading voltage (e.g., lower than 1.2~1.5V) is applied on the $BL_0$, while other bit lines (e.g., $BL_1$) are each applied with a voltage signal that is about 0V. One conduction path 601 is made available to conduct current from the $BL_0$, through the fuse resistor 210, the CG transistor 230, and the WL transistor 250, to ground. Since the fuse resistor 210 has been burned (i.e., programmed as an open circuit), no current can flow through such a conduction path 601. Consequently, no current (or a current level less than a predefined threshold) is present on the $BL_0$, and thus, the efuse memory cell 103A can be determined as being permanently programmed to logic 1 (e.g., having a blown fuse resistor connected to the activated CG transistor).

Similarly, to read the efuse memory cell 103D, the $WL_1$ is asserted through applying a voltage signal corresponding to a logic high state (e.g., about 0.75V), while other word lines (e.g., $WL_0$) are each applied with a voltage signal corresponding to a logic low state (e.g., about 0V). Concurrently or subsequently, one of the $CG_2$ or $CG_3$ (e.g., $CG_2$) is asserted through applying a voltage signal that is also about 0.75V, while other control gate lines (e.g., $CG_3$, $CG_0$ and $CG_1$) are each applied with a voltage signal that is about 0V As such, the WL transistors 250 and 260 and the CG transistor 230 of the efuse memory cell 103D can be turned on, and the CG transistor 240 of the efuse memory cell 103D, the WL transistors and CG transistors of other efuse memory cells remain deactivated. Next, a reading voltage (e.g., lower than 1.2~1.5V) is applied on the $BL_1$, while other bit lines (e.g., $BL_0$) are each applied with a voltage signal that is about 0V. One conduction path 603 is made available to conduct current from the $BL_1$, through the fuse resistor 210, the CG transistor 230, and the WL transistor 250, to ground. Since the fuse resistor 210 has not been burned (i.e., programmed as an open circuit), current can flow through such a conduction path 603. Consequently, current (or a current level higher than a predefined threshold) is present on the $BL_1$, and thus, the efuse memory cell 103D can be determined as being permanently programmed to logic 0 (e.g., having an intact fuse resistor connected to the activated CG transistor).

Figure 7:
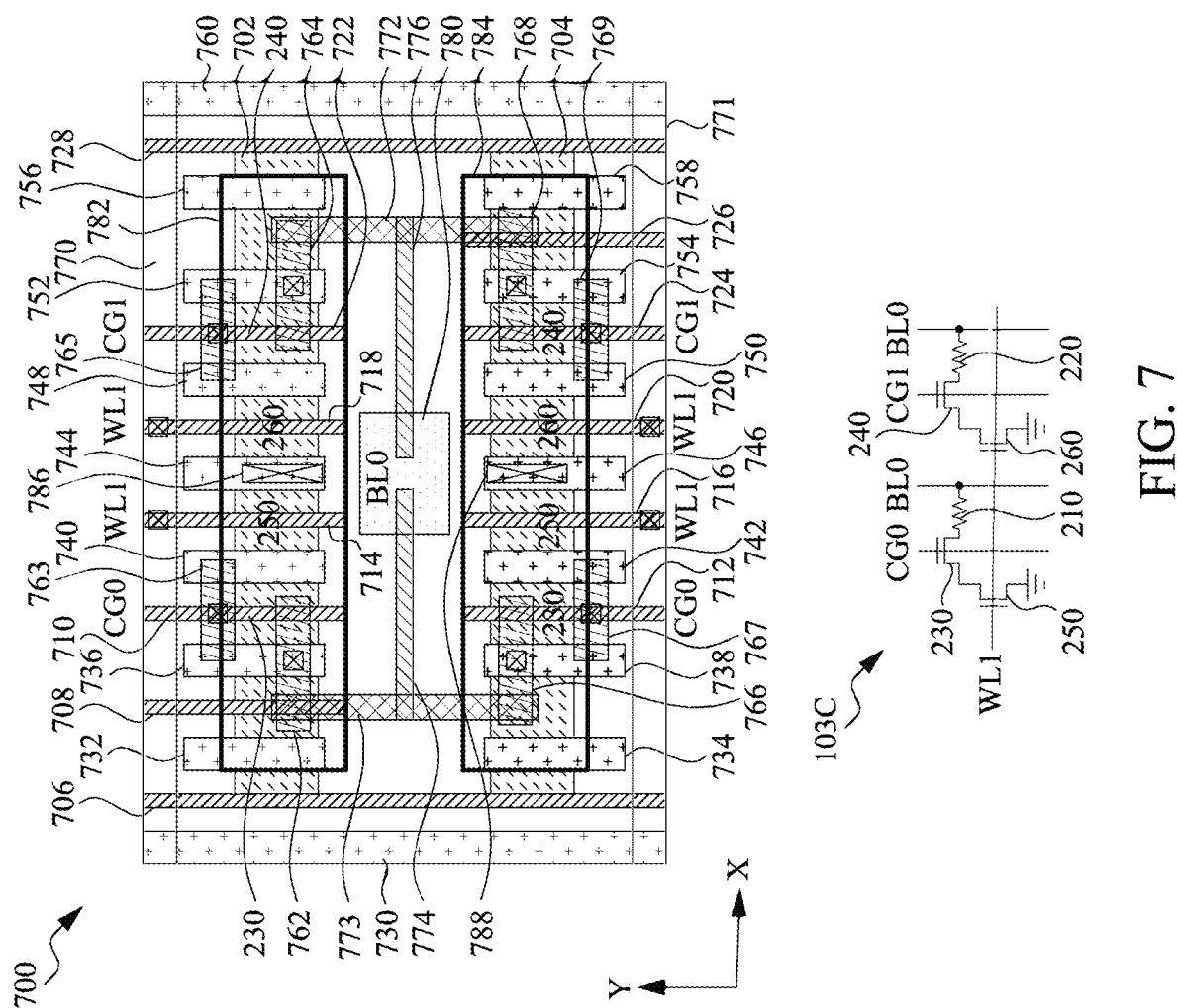
FIG. 7 illustrates a layout configured to form one memory cell shown in FIG. 2, in accordance with some embodiments.

FIG. 7 illustrates a schematic diagram of one efuse memory cell 103 implemented according to the schematic design 200 of FIG. 2 (the 4T2R configuration), and an example layout 700 configured to form the same, in accordance with some embodiments. For example, the layout 700 is configured to form the efuse memory cell 103C in FIG. 2, and thus, some of the references of FIG. 2 will be reused.

As shown, the layout 700 includes patterns 702 and 704 that are each configured to forma an active region (hereinafter "active region 702" and "active region 704," respectively); and patterns 706, 708, 710, 712, 714, 716, 718, 720, 722, 724, 726, and 728 that are each configured to forma a gate structure (hereinafter "gate structure 706," "active region 708," "gate structure 710," "gate structure 712," "gate structure 714," "gate structure 716," "gate structure 718," "gate structure 720," "gate structure 722," "gate structure 724," "gate structure 726," and "gate structure 728," respectively). In some embodiments, such active regions and gate structures are formed along the major frontside surface of a substrate (sometimes referred to as part of "front-end-of-line (FEOL) processing/network").

Over the frontside surface of the substrate, a number of frontside metallization layers can be formed (sometimes referred to as part of "back-end-of-line (BEOL) processing/network"); and over a backside surface of the substrate, a number of backside metallization layers can be formed, which will be discussed below.

The active regions 702-704 may each extend along a first lateral direction (e.g., X-direction), and the gate structures 706-728 may each extend along a second, different lateral direction (e.g., Y-direction). In some embodiments, the active regions 702-704 are each formed of a stack structure protruding from the major surface of the substrate. The stack includes a number of semiconductor nanostructures (e.g., nanosheets) extending along the X-direction and vertically separated from each other. Portions of the semiconductor structures in the stack that are overlaid by the gate structures 706-728 remain, while other portions are replaced with a number of epitaxial structures. The remaining portions of the semiconductor structures can be configured as the channel of a corresponding transistor, the epitaxial structures coupled to both sides (or ends) of the remaining portions of the semiconductor structures can be configured as source/drain structures (or terminals) of the transistor, and a portion of the gate structure that overlays (e.g., straddles) the remaining portions of the semiconductor structures can be configured as a gate structures (or terminal) of the transistor.

As a representative example in FIG. 7, a portion of the active region portion 702 that is overlaid by the gate structure 714 may include a number of nanostructures vertically separated from each other, which can function as a channel of a first portion of the WL transistor 250. Portions of the active region portion 702 that are disposed on opposite sides of the gate structure 714 are replaced with epitaxial structures. Such epitaxial structures can function as the source/drain terminals of the first portion of the WL transistor 250, respectively. The gate structure 714 can function as the gate terminal of the first portion of the WL transistor 250. A second portion of the WL transistor 250 can be formed by the active region 704 and the gate structure 716. The first and second portions of the WL transistor 250 can be connected in parallel.

As another representative example, a portion of the active region portion 702 that is overlaid by the gate structure 710 may include a number of nanostructures vertically separated from each other, which can function as a channel of a first portion of the CG transistor 230. Portions of the active region portion 702 that are disposed on opposite sides of the gate structure 710 are replaced with epitaxial structures. Such epitaxial structures can function as the source/drain terminals of the first portion of the CG transistor 230, respectively. The gate structure 710 can function as the gate terminal of the first portion of the CG transistor 230. A second portion of the CG transistor 230 can be formed by the active region 704 and the gate structure 712. The first and second portions of the CG transistor 230 can be connected in parallel. Other transistors 240 and 260 can be formed similarly, and thus, the description is not repeated.

Upon forming the active regions 702 to 704 and the gate structures 706 to 728, at least the transistors 230 to 260 can be defined. Accordingly, the gate structures 710-712 can each operatively serve as a part of the $CG_0$ (that gates the CG transistor 230), the gate structures 714-716 can each operatively serve as a part of the $WL_1$ (that gates the WL transistor 250), the gate structures 722-724 can each operatively serve as a part of the $CG_1$ (that gates the CG transistor 240), and the gate structures 718-720 can operatively serve as another part of the $WL_1$ (that gates the WL transistor 260), as indicated in FIG. 7.

The layout 700 further includes patterns 730, 732, 734, 736, 738, 740, 742, 744, 746, 748, 750, 752, 754, 756, 758, and 760 that are configured to form a middle-end interconnect structure, sometimes referred to as an MD (hereinafter "MD 730," "MD 732," "MD 734," "MD 736," "MD 738," "MD 740," "MD 742," "MD 744," "MD 746," "MD 748," "MD 750," "MD 752," "MD 754," "MD 756," "MD 758," and "MD 760," respectively). Each MD can connect a corresponding source/drain terminal to an upper interconnect structure through a middle-end via structure, sometimes referred to as a VD. Further, each gate structure can be coupled to an upper interconnect structure through another middle-end via structure, sometimes referred to as a VG.

Above these middle-end structures on the frontside of the substrate, a number of metallization layers can be formed, e.g., M0, M1, M2, M3, etc., each of which includes a number of metal tracks or lines embedded in a corresponding dielectric material (e.g., inter-metal dielectric (IMD)/inter-layer dielectric (ILD)). For example, the layout 700 further includes patterns 762, 763, 764, 765, 766, 767, 768, 769, 770, and 771 that are each configured to form a metal track in the M0 layer (hereinafter "M0 track 762," "M0 track 763," "M0 track 764," "M0 track 765," "M0 track 766," "M0 track 767," "M0 track 768," "M0 track 769," "M0 track 770," and "M0 track 771," respectively); patterns 773 and 772 that are each configured to form a metal track in the M1 layer (hereinafter "M1 track 773" and "M1 track 772," respectively); patterns 774 and 776 that are each configured to form a metal track in the M2 layer (hereinafter "M2 track 774" and "M2 track 776," respectively); and pattern 780 that is configured to form a metal track in the M3 layer (hereinafter "M3 track 780").

In some embodiments, the gate structures 714 and 718 are connected to each other through at least the M0 track 770, and the gate structures 716 and 720 are connected to each other through at least the M0 track 771, each of the M0 tracks 770 and 771 configured to connect all parts of the part of the $WL_1$. The CG transistor 230 has one of its source/drain terminals in electrical connection to a first end of the M2 track 774 through at least the MD 736, M0 track 762, and M1 track 770, and through at least the MD 738, M0 track 766, and M1 track 773. The CG transistor 230 has its gate terminal, e.g., gate structures 710 and 712, connected to the M0 tracks 763 and 767, respectively. As shown, the MD 736, M0 track 762, and M0 track 763 are symmetric to the MD 738, M0 track 766, and M0 track 767, respectively. The CG transistor 230 has the other one of its source/drain terminals connected to one of the source/drain terminals of the WL transistor 250. The M2 track 774 can operatively serve as the fuse resistor 210. Similarly, the CG transistor 240 has one of its source/drain terminals in electrical connection to a first end of the M2 track 776 through at least the MD 752, M0 track 764, and M1 track 772 and through at least the MD 754, M0 track 768, and M1 track 773. The CG transistor 240 has its gate terminal, e.g., gate structures 722 and 724, connected to the M0 tracks 765 and 769, respectively. As shown, the MD 752, M0 track 764, and M0 track 765 are symmetric to the MD 754, M0 track 768, and M0 track 769, respectively. The CG transistor 240 has the other one of its source/drain terminals connected to one of the source/drain terminals of the WL transistor 260. The M2 track 776 can operatively serve as the fuse resistor 220. A second end of the M2 track 774 and a second end of the M2 track 776 are coupled to each other through the M3 track 780, which can operatively serve as a part of the $BL_0$.

The layout 700 further includes patterns 782 and 784 that are each configured to form a metal track in a first backside metallization layer (hereinafter "BM0 track 782," and "BM0 track 784," respectively). In some embodiments, the first backside metallization layer is the bottommost metallization layer with respect to the backside surface of the substrate. Further, on the backside of the substrate, a plural number of metallization layers can be formed, sometimes referred to as BM1, BM2, BM3, etc., each of which includes a number of metal tracks or lines embedded in a corresponding dielectric material (e.g., inter-metal dielectric (IMD)/inter-layer dielectric (ILD)).

As shown in FIG. 7, the BM0 track 782 may extend across the active region 702 along the X-direction when viewed from the top, e.g., overlapping with the active region 702 when viewed from the top; and the BM0 track 784 may extend across the active region 704 along the X-direction when viewed from the top, e.g., overlapping with the active region 704 when viewed from the top. In some embodiments, the BM0 tracks 782 and 784 are each configured to carry a supply voltage (VSS or ground), and supply this supply voltage to the transistors formed on the frontside of the substrate. For example, in the upper half of the layout 700 (the first portions of the transistors 230-260), the BM0 track 782 is in electrical connection with the common source/drain terminal of the WL transistors 250 and 260 through a backside via structure (sometimes referred to as "VB") formed by a pattern 786. It should be noted this common source/drain terminal of the WL transistors 250 and 260 is also connected to the MD 744 on its frontside. In the lower half of the layout 700 (the second portions of the transistors 230-260), the BM0 track 784 is in electrical connection with the common source/drain terminal of the WL transistors 250 and 260 through another backside via structure (VB) formed by a pattern 788. Similarly, this common source/drain terminal of the WL transistors 250 and 260 is also connected to the MD 746 on its frontside.

Figure 8:
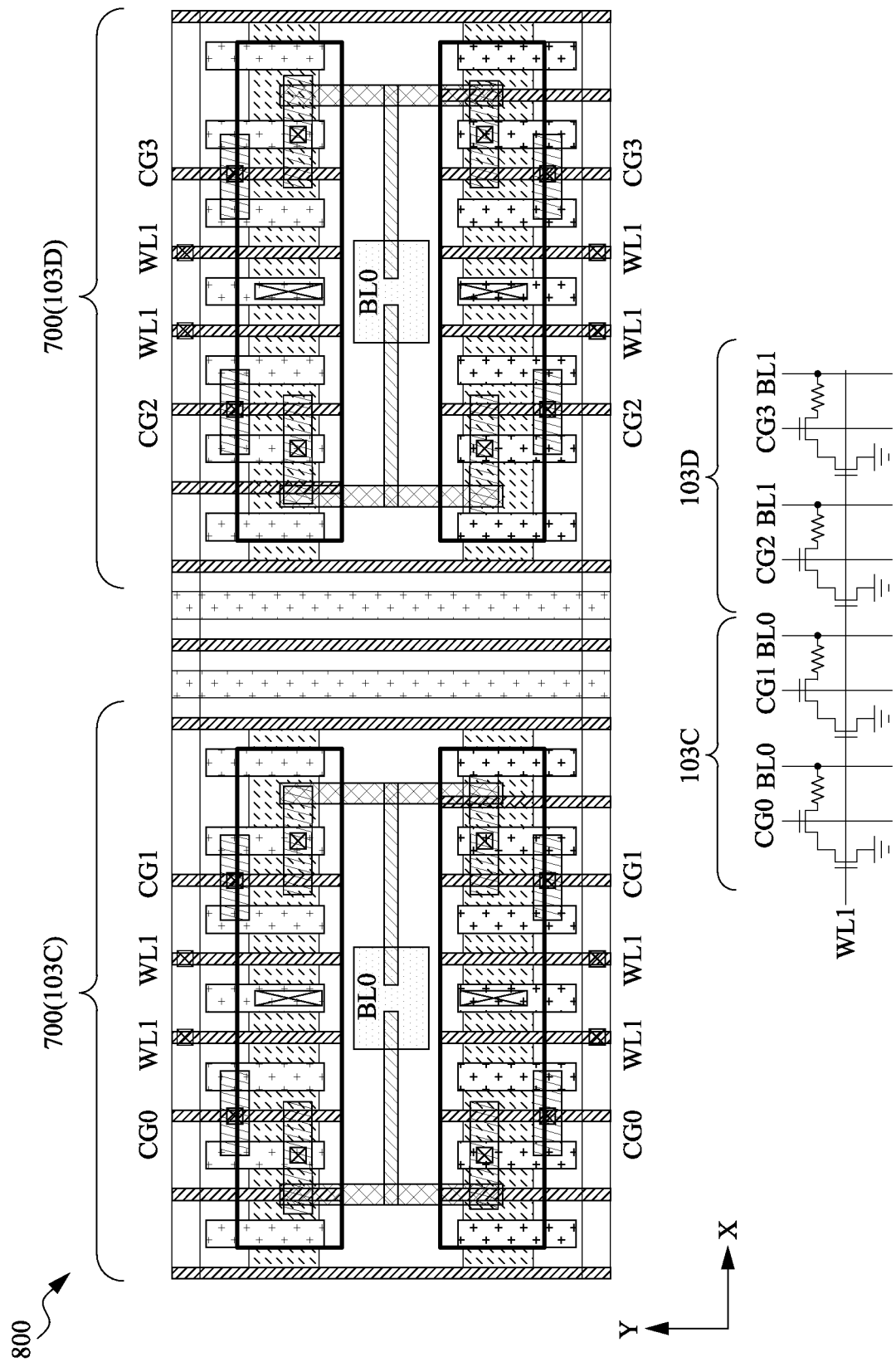
FIG. 8 illustrates a layout configured to form two memory cells shown in FIG. 2, in accordance with some embodiments.

FIG. 8 illustrates a schematic diagram of two efuse memory cells 103 implemented according to the schematic design 200 of FIG. 2 (the 4T2R configuration), and an example layout 800 configured to form the same, in accordance with some embodiments. For example, the layout 800 is configured to form the efuse memory cells 103C and 103D, and thus, some of the references of FIG. 2 will be reused. As shown, the layout 800 includes two layouts 700 abutted to each other along the X-direction, and thus, the description will be briefly provided. The layout 700 on the left-hand side may correspond to the efuse memory cell 103C (which is almost identical to layout shown in FIG. 7), and the layout 700 on the right-hand side may correspond to the efuse memory cell 103D (which is again similar to layout shown in FIG. 7). For example, the layout 700 on the right also includes a number of gate structures operatively configured as the $WL_1$, $CG_2$, and $CG_3$, respectively, and includes two M2 tracks operatively configured as the two fuse resistors of the efuse memory cell 103D, respectively, that are connected through an M3 track operatively serving as the $BL_1$.

Figure 9:
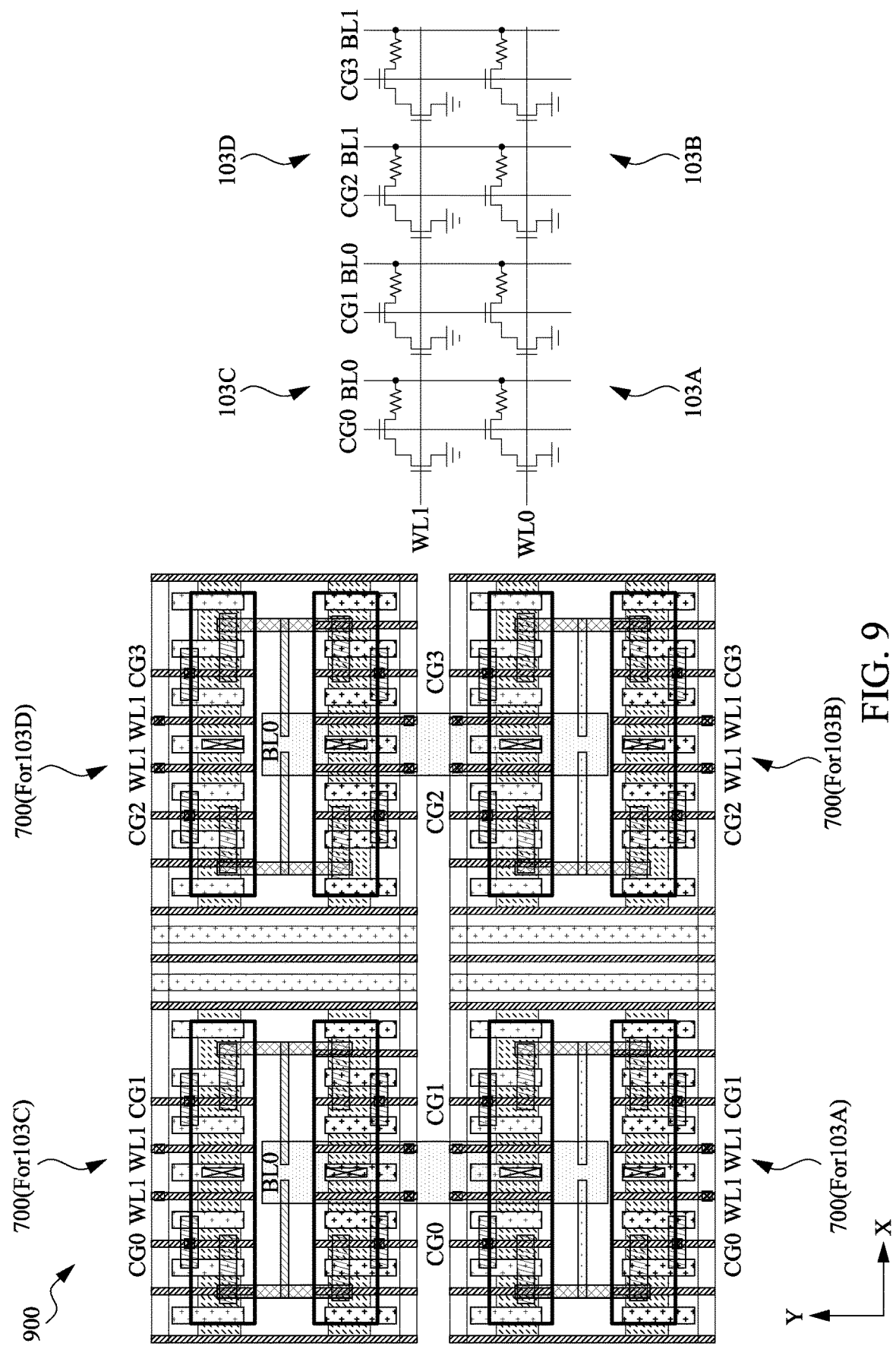
FIG. 9 illustrates a layout configured to form four memory cells shown in FIG. 2, in accordance with some embodiments.

FIG. 9 illustrates a schematic diagram of four efuse memory cells 103 implemented according to the schematic design 200 of FIG. 2 (the 4T2R configuration), and an example layout 900 configured to form the same, in accordance with some embodiments. For example, the layout 900 is configured to form the efuse memory cells 103A, 103B, 103C, and 103D, and thus, some of the references of FIG. 2 will be reused. As shown, the layout 900 includes four layouts 700 abutted to each other along the X-direction and the Y-direction, respectively, and thus, the description will be briefly provided. The layout 700 at the top left corner may correspond to the efuse memory cell 103C, the layout 700 at the top right corner may correspond to the efuse memory cell 103D, the layout 700 at the bottom left corner may correspond to the efuse memory cell 103A, and the layout 700 at the bottom right corner may correspond to the efuse memory cell 103B. Each of the layouts 700 shown in FIG. 9 is substantially similar to the layout 700 of FIG. 7.

For example, the layout 700 corresponding to the efuse memory cell 103C is identical to the layout in FIG. 7. The layout 700 corresponding to the efuse memory cell 103D also includes a number of gate structures operatively configured as the $WL_1$, $CG_2$, and $CG_3$, respectively, and includes two M2 tracks operatively configured as the two fuse resistors of the efuse memory cell 103D, respectively, that are connected through an M3 track operatively serving as the $BL_1$. The layout 700 corresponding to the efuse memory cell 103A also includes a number of gate structures operatively configured as the $WL_0$, $CG_0$, and $CG_1$, respectively, and includes two M2 tracks operatively configured as the two fuse resistors of the efuse memory cell 103A, respectively, that are connected through an M3 track operatively serving as the $BL_0$. The layout 700 corresponding to the efuse memory cell 103B also includes a number of gate structures operatively configured as the $WL_0$, $CG_2$, and $CG_3$, respectively, and includes two M2 tracks operatively configured as the two fuse resistors of the efuse memory cell 103B, respectively, that are connected through an M3 track operatively serving as the $BL_1$. As shown, the M3 track configured as the $BL_0$ may extend in the Y-direction to cross the layouts corresponding to the efuse memory cells 103C and 103A, and the M3 track configured as the $BL_1$ may extend in the Y-direction to cross the layouts corresponding to the efuse memory cells 103D and 103B.

Figure 10:
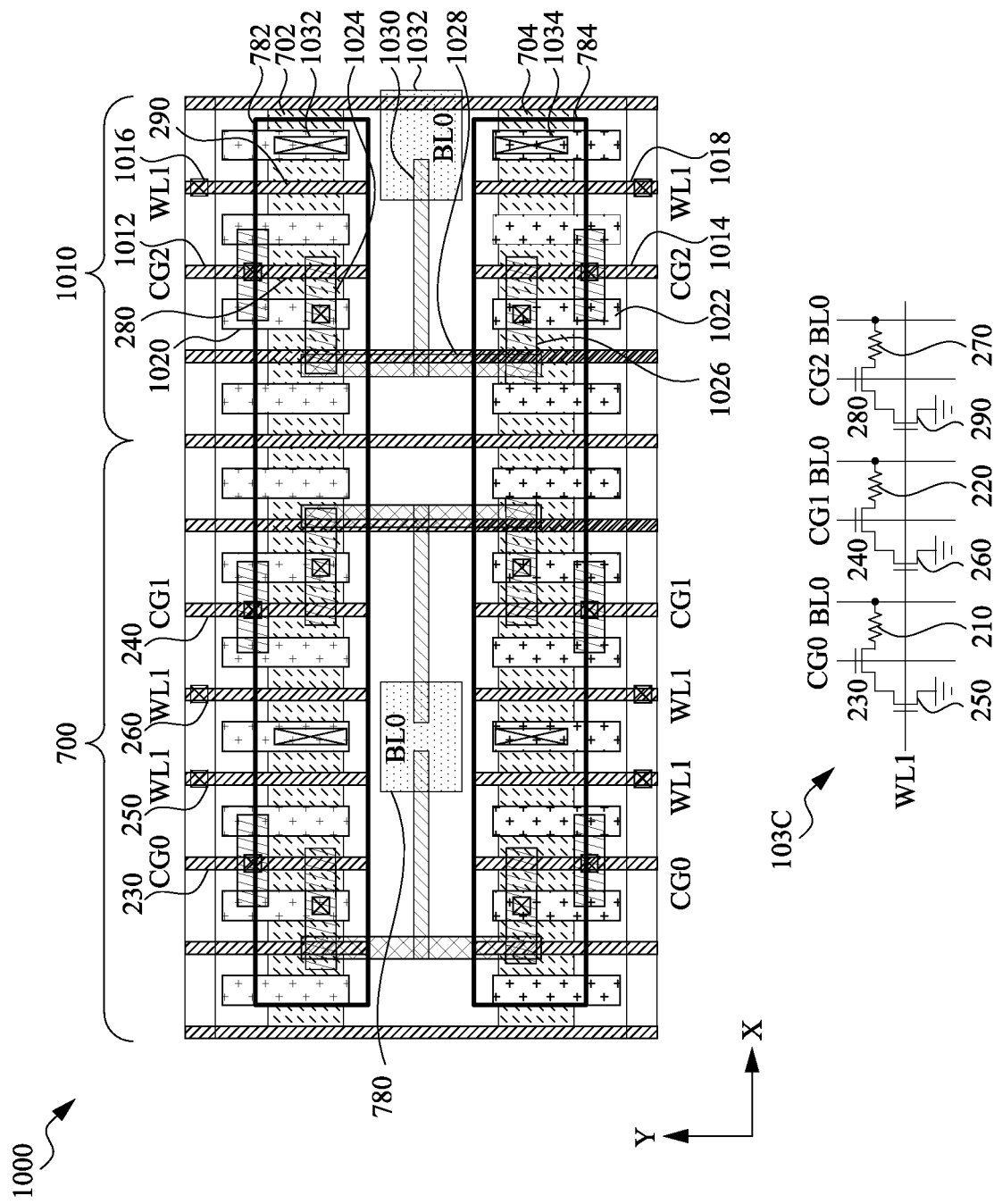
FIG. 10 illustrates a layout configured to form one memory cell based on the schematic of FIG. 2, in accordance with some embodiments.

FIG. 10 illustrates a schematic diagram of one efuse memory cell 103 that is implemented as three fuse resistors, three CG transistors, and three WL transistors and an example layout 1000 configured to form the same. Such a schematic design in FIG. 10 is sometimes referred to as 6-transistor-3-resistor (6T3R) configuration. In some embodiments, the layout 1000 is configured to form the efuse memory cell 103C in FIG. 2, and thus, some of the references of FIG. 2 will be reused.

In the 6T3R configuration of FIG. 10, in addition to the fuse resistors 210-220, CG transistors 230-240, and WL transistors 250-260 (as shown above in the 4T2R configuration of FIG. 2), the efuse memory cell 103C includes another fuse resistor 270, another CG transistor 280 and another WL transistor 290. The fuse resistor 270 also has one of its end connected to the $BL_0$, and the other end connected to a first source/drain terminal of the CG transistor 280. The CG transistor 280 is gated by another CG line, $CG_2$. The CG transistor 280 has its second source/drain terminal connected to a first source/drain terminal of the WL transistor 290, with a second source/drain terminal of the WL transistor 290 connected to ground. The WL transistor 290 is also gated by the $WL_1$.

Accordingly, the layout 1000 can include a certain portion that is substantially similar to the layout 700 of FIG. 7 (e.g., the layout 700 on the left-hand side of FIG. 10), and another portion (e.g., 1010) that can be configured to form the additional fuse resistor, CG transistor, and WL transistor. For example, the layout portion 1010 can include the active regions 702 and 704 further extending thereto along the X-direction, respectively, and a number of patterns for forming gate structures, 1012, 1014, 1016, and 1018. Such gate structures 1012 to 1018, together with the active regions 702 and 704, can form the CG transistor 280 and the WL transistor 290. As shown, the CG transistor 280 can include a first portion formed by the active region 702 and the gate structure 1012, and a second portion formed by the active region 704 and the gate structure 1014; and the WL transistor 290 can include a first portion formed by the active region 702 and the gate structure 1016, and a second portion formed by the active region 704 and the gate structure 1018. As such, the gate structures 1012 and 1014 can each be configured as a part of the $CG_2$, and the gate structures 1016 and 1018 can each be configured as a part of the $WL_1$.

The layout portion 1010 also includes patterns configured to form MDs 1020 and 1022, M0 tracks 1024 and 1026, M1 track 1028, M2 track 1030, and M3 track 1032, respectively. The MD 1020, M0 track 1024, and M1 track 1028 can connect one of the source/drain terminals of the first portion of the CG transistor 280 to one end of the M2 track 1030, which operatively serves as the fuse resistor 270; and the MD 1022, M0 track 1026, and M1 track 1028 can connect one of the source/drain terminals of the second portion of the CG transistor 280 to the same end of the M2 track 1030, which operatively serves as the fuse resistor 270. The other end of the M2 track 1030 can be connected to the M3 track 1032, which operatively serves as a part of the $BL_0$. It should be noted that the M3 track 1032 and the M3 track 780 may be coupled to each other through one or more other metal tracks (not shown).

Further, the layout portion 1010 can include the BM0 tracks 782 and 784 further extending thereto along the X-direction, respectively. Similarly, one of the source/drain terminals of the first portion of the WL transistor 290 is in electrical connection with the BM0 track 782 through a backside via structure (VB) formed by a pattern 1032, with the other source/drain terminal of the first portion of the WL transistor 290 connected to the first portion of the CG transistor 280; and one of the source/drain terminals of the second portion of the WL transistor 290 is in electrical connection with the BM0 track 784 through another backside via structure (VB) formed by a pattern 1034, with the other source/drain terminal of the second portion of the WL transistor 290 connected to the second portion of the CG transistor 280.

Figure 11:
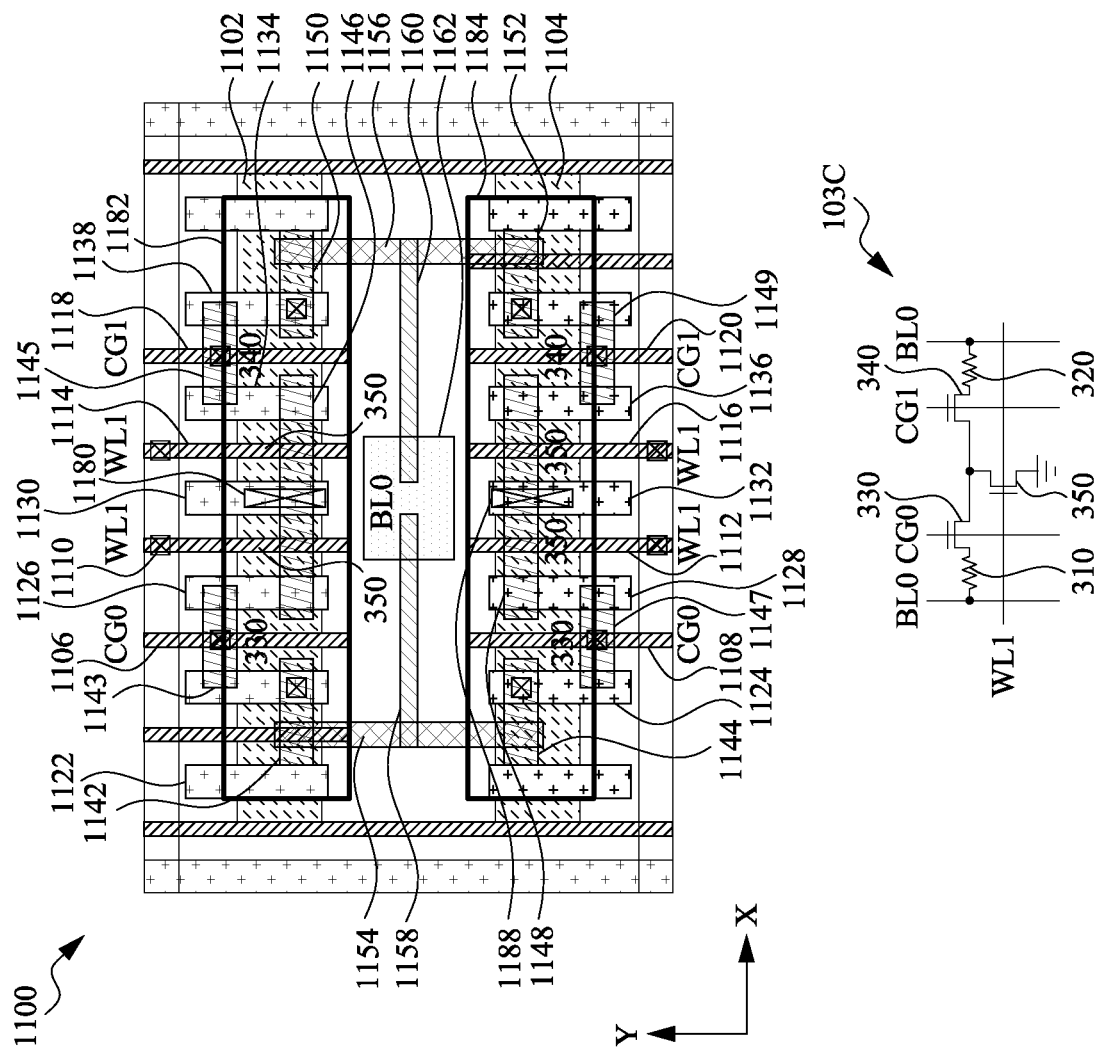
FIG. 11 illustrates a layout configured to form one memory cell shown in FIG. 3, in accordance with some embodiments.

FIG. 11 illustrates a schematic diagram of one efuse memory cell 103 implemented according to the schematic design 300 of FIG. 3 (the 3T2R configuration), and an example layout 1100 configured to form the same, in accordance with some embodiments. For example, the layout 1100 is configured to form the efuse memory cell 103C in FIG. 3, and thus, some of the references of FIG. 3 will be reused.

As shown, the layout 1100 includes patterns 1102 and 1104 that are each configured to forma an active region (hereinafter "active region 1102" and "active region 1104," respectively); and patterns 1106, 1108, 1110, 1112, 1114, 1116, 1118, and 1120 that are each configured to form agate structure (hereinafter "gate structure 1106," "active region 1108," "gate structure 1110," "gate structure 1112," "gate structure 1114," "gate structure 1116," "gate structure 1118," and "gate structure 1120," respectively). In some embodiments, such active regions and gate structures are formed along the major frontside surface of a substrate (sometimes referred to as part of "front-end-of-line (FEOL) processing/ network"). Over the frontside surface of the substrate, a number of frontside metallization layers can be formed (sometimes referred to as part of "back-end-of-line (BEOL) processing/network"); and over a backside surface of the substrate, a number of backside metallization layers can be formed, which will be discussed below.

The active regions 1102-1104 may each extend along a first lateral direction (e.g., X-direction), and the gate structures 1106-1120 may each extend along a second, different lateral direction (e.g., Y-direction). In some embodiments, the active regions 1102-1104 are each formed of a stack structure protruding from the major surface of the substrate. The stack includes a number of semiconductor nanostructures (e.g., nanosheets) extending along the X-direction and vertically separated from each other. Portions of the semiconductor structures in the stack that are overlaid by the gate structures 1106-1120 remain, while other portions are replaced with a number of epitaxial structures. The remaining portions of the semiconductor structures can be configured as the channel of a corresponding transistor, the epitaxial structures coupled to both sides (or ends) of the remaining portions of the semiconductor structures can be configured as source/drain structures (or terminals) of the transistor, and a portion of the gate structure that overlays (e.g., straddles) the remaining portions of the semiconductor structures can be configured as a gate structures (or terminal) of the transistor.

As a representative example in FIG. 11, a portion of the active region portion 1102 that is overlaid by the gate structure 1110 may include a number of nanostructures vertically separated from each other, which can function as a channel of a first portion of the WL transistor 350. Portions of the active region portion 1102 that are disposed on opposite sides of the gate structure 1110 are replaced with epitaxial structures. Such epitaxial structures can function as the source/drain terminals of the first portion of the WL transistor 350, respectively. The gate structure 1110 can function as the gate terminal of the first portion of the WL transistor 350. A second portion of the WL transistor 350 can be formed by the active region 1102 and the gate structure 1114. A third portion of the WL transistor 350 can be formed by the active region 1104 and the gate structure 1112. A fourth portion of the WL transistor 350 can be formed by the active region 1104 and the gate structure 1116. The first to fourth portions of the WL transistor 350 can be connected in parallel.

As another representative example, a portion of the active region portion 1102 that is overlaid by the gate structure 1106 may include a number of nanostructures vertically separated from each other, which can function as a channel of a first portion of the CG transistor 330. Portions of the active region portion 1102 that are disposed on opposite sides of the gate structure 1106 are replaced with epitaxial structures. Such epitaxial structures can function as the source/drain terminals of the first portion of the CG transistor 330, respectively. The gate structure 1106 can function as the gate terminal of the first portion of the CG transistor 330. A second portion of the CG transistor 330 can be formed by the active region 1104 and the gate structure 1108. The first and second portions of the CG transistor 330 can be connected in parallel. The other CG transistor 340 can be formed similarly, and thus, the description is not repeated.

Upon forming the active regions 1102 to 1104 and the gate structures 1106 to 1120, at least the transistors 330 to 350 can be defined. Accordingly, the gate structures 1106-1108 can each operatively serve as a part of the $CG_0$ (that gates the CG transistor 330), the gate structures 1110-1116 can each operatively serve as a part of the $WL_1$ (that gates the WL transistor 350), and the gate structures 1118-1120 can each operatively serve as a part of the $CG_1$ (that gates the CG transistor 340), as indicated in FIG. 11.

The layout 1100 further includes patterns 1122, 1124, 1126, 1128, 1130, 1132, 1134, 1136, 1138, and 1140 that are configured to form a middle-end interconnect structure, sometimes referred to as an MD (hereinafter "MD 1122," "MD 1124," "MD 1126," "MD 1128," "MD 1130," "MD 1132," "MD 1134," "MD 1136," "MD 1138," and "MD 1140," respectively). Each MD can connect a corresponding source/drain terminal to an upper interconnect structure through a middle-end via structure, sometimes referred to as a VD. Further, each gate structure can be coupled to an upper interconnect structure through another middle-end via structure, sometimes referred to as a VG.

Above these middle-end structures on the frontside of the substrate, a number of metallization layers can be formed, e.g., M0, M1, M2, M3, etc., each of which includes a number of metal tracks or lines embedded in a corresponding dielectric material (e.g., inter-metal dielectric (IMD)/ inter-layer dielectric (ILD)). For example, the layout 1100 further includes patterns 1142, 1143, 1144, 1145, 1146, 1147, 1148, 1149, 1150, and 1152 that are each configured to form a metal track in the M0 layer (hereinafter "M0 track 1142," "M0 track 1143," "M0 track 1144," "M0 track 1145," "M0 track 1146," "M0 track 1147," "M0 track 1148," "M0 track 1149," "M0 track 1150," and "M0 track 1152," respectively); patterns 1154 and 1156 that are each configured to form a metal track in the M1 layer (hereinafter "M1 track 1154" and "M1 track 1156," respectively); patterns 1158 and 1160 that are each configured to form a metal track in the M2 layer (hereinafter "M2 track 1158" and "M2 track 1160," respectively); and pattern 1162 that is configured to form a metal track in the M3 layer (hereinafter "M3 track 1162").

In some embodiments, the CG transistor 330 has one of its source/drain terminals in electrical connection to a first end of the M2 track 1158 through at least the MD 1122, M0 track 1142, and M1 track 1154, and through at least the MD 1124, M0 track 1144, and M1 track 1154. The CG transistor 330 has the other one of its source/drain terminals connected to one of the source/drain terminals of the WL transistor 350. The M2 track 1158 can operatively serve as the fuse resistor 310. Similarly, the CG transistor 340 has one of its source/drain terminals in electrical connection to a first end of the M2 track 1160 through at least the MD 1138, M0 track 1150, and M1 track 1156 and through at least the MD 1140, M0 track 1152, and M1 track 1156. The CG transistor 340 has the other one of its source/drain terminals connected to one of the source/drain terminals of the WL transistor 350. The M2 track 1160 can operatively serve as the fuse resistor 320. A second end of the M2 track 1158 and a second end of the M2 track 1160 are coupled to each other through the M3 track 1160, which can operatively serve as a part of the $BL_0$.

The layout 1100 further includes patterns 1182 and 1184 that are each configured to form a metal track in a first backside metallization layer (hereinafter "BM0 track 1182," and "BM0 track 1184," respectively). In some embodiments, the first backside metallization layer is the bottommost metallization layer with respect to the backside surface of the substrate. Further, on the backside of the substrate, a plural number of metallization layers can be formed, sometimes referred to as BM1, BM2, BM3, etc., each of which includes a number of metal tracks or lines embedded in a corresponding dielectric material (e.g., inter-metal dielectric (IMD)/inter-layer dielectric (ILD)).

As shown in FIG. 11, the BM0 track 1182 may extend across the active region 1102 along the X-direction when viewed from the top, e.g., overlapping with the active region 1102 when viewed from the top; and the BM0 track 1184 may extend across the active region 1104 along the X-direction when viewed from the top, e.g., overlapping with the active region 1104 when viewed from the top. In some embodiments, the BM0 tracks 1182 and 1184 are each configured to carry a supply voltage (VSS or ground), and supply this supply voltage to the transistors formed on the frontside of the substrate. For example, in the upper half of the layout 1100 (the first portions of the transistors 330-350), the BM0 track 1182 is in electrical connection with the common source/drain terminal of the WL transistor 350 through a backside via structure (sometimes referred to as "VB") formed by a pattern 1186. It should be noted this common source/drain terminal of the WL transistor 350 is also connected to the MD 1130 on its frontside. In the lower half of the layout 1100 (the second portions of the transistors 330-350), the BM0 track 1184 is in electrical connection with the common source/drain terminal of the WL transistor 350 through another backside via structure (VB) formed by a pattern 1188. Similarly, this common source/drain terminal of the WL transistor 350 is also connected to the MD 1132 on its frontside.

Figure 12:
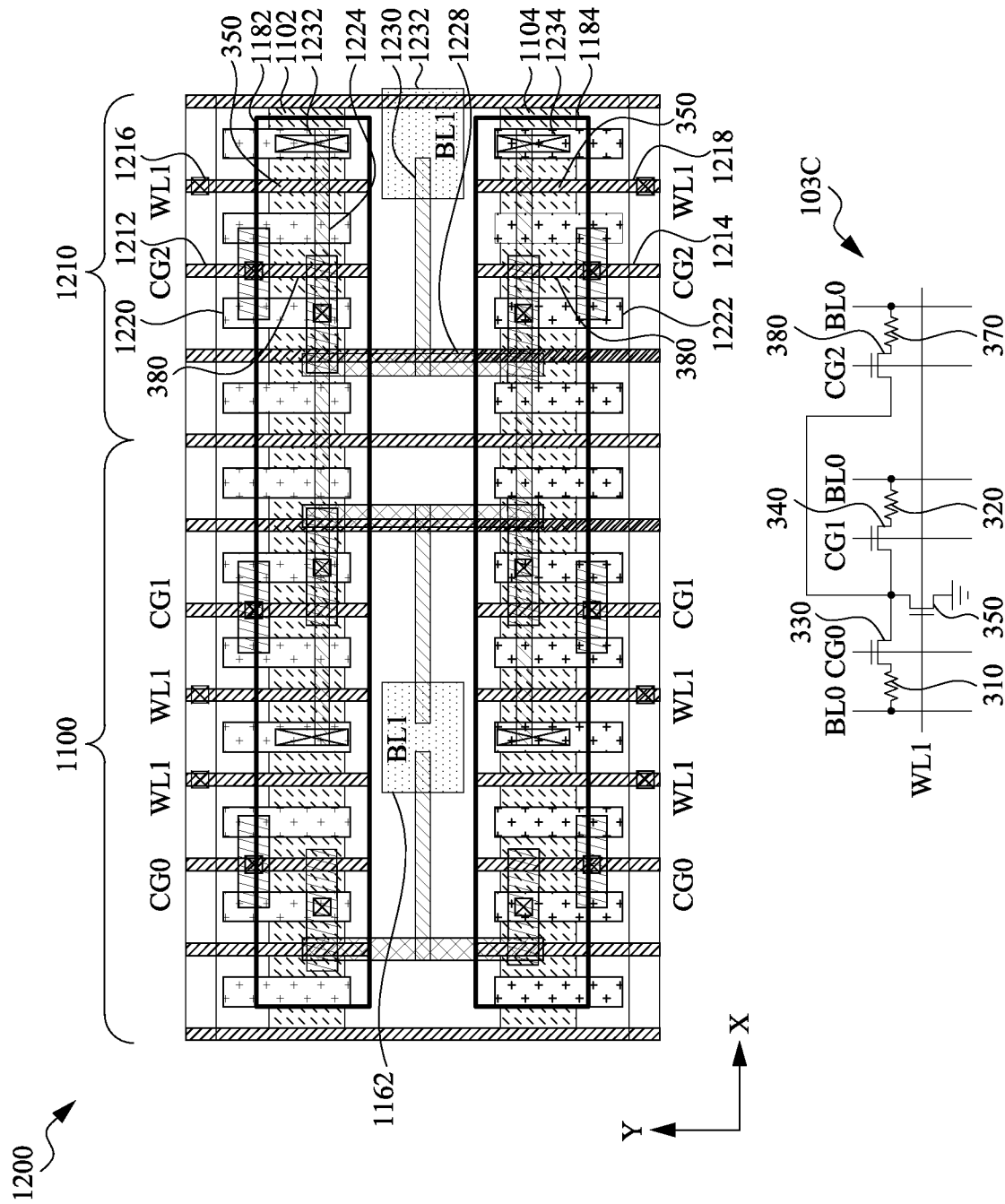
FIG. 12 illustrates a layout configured to form one memory cell based on the schematic of FIG. 3, in accordance with some embodiments.

FIG. 12 illustrates a schematic diagram of one efuse memory cell 103 that is implemented as three fuse resistors, three CG transistors, and one WL transistor and an example layout 1200 configured to form the same. Such a schematic design in FIG. 12 is sometimes referred to as 4-transistor-3-resistor (4T3R) configuration. In some embodiments, the layout 1200 is configured to form the efuse memory cell 103C in FIG. 3, and thus, some of the references of FIG. 3 will be reused.

In the 4T3R configuration of FIG. 12, in addition to the fuse resistors 310-320, CG transistors 330-340, and WL transistor 350 (as shown above in the 3T2R configuration of FIG. 3), the efuse memory cell 103C includes another fuse resistor 370 and another CG transistor 380. The fuse resistor 370 also has one of its end connected to the $BL_0$, and the other end connected to a first source/drain terminal of the CG transistor 380. The CG transistor 380 is gated by another CG line, $CG_2$. The CG transistor 380 has its second source/drain terminal connected to the first source/drain terminal of the WL transistor 350, that is also connected to each of the CG transistors 330-340 in series.

Accordingly, the layout 1200 can include a certain portion that is substantially similar to the layout 1100 of FIG. 11 (e.g., the layout 1100 on the left-hand side of FIG. 12), and another portion (e.g., 1210) that can be configured to form the additional fuse resistor and CG transistor. For example, the layout portion 1210 can include the active regions 1102 and 1104 further extending thereto along the X-direction, respectively, and a number of patterns for forming gate structures, 1212, 1214, 1216, and 1218. Such gate structures 1212 to 1218, together with the active regions 1102 and 1104, can form the CG transistor 380 and other portions of the WL transistor 350. As shown, the CG transistor 380 can include a first portion formed by the active region 1102 and the gate structure 1212, and a second portion formed by the active region 1104 and the gate structure 1214; and the WL transistor 350 can include a fifth portion formed by the active region 1102 and the gate structure 1216, and a sixth portion formed by the active region 1104 and the gate structure 1218. As such, the gate structures 1212 and 1214 can each be configured as a part of the $CG_2$, and the gate structures 1216 and 1218 can each be configured as a part of the $WL_1$.

The layout portion 1210 also includes patterns configured to form MDs 1220 and 1222, M0 tracks 1224 and 1226, M1 track 1228, M2 track 1230, and M3 track 1232, respectively. The MD 1220, M0 track 1224, and M1 track 1228 can connect one of the source/drain terminals of the first portion of the CG transistor 380 to one end of the M2 track 1230, which operatively serves as the fuse resistor 370; and the MD 1222, M0 track 1226, and M1 track 1228 can connect one of the source/drain terminals of the second portion of the CG transistor 380 to the same end of the M2 track 1230, which operatively serves as the fuse resistor 370. The other end of the M2 track 1230 can be connected to the M3 track 1232, which operatively serves as a part of the $BL_0$. It should be noted that the M3 track 1232 and the M3 track 1162 may be coupled to each other through one or more other metal tracks (not shown).

Further, the layout portion 1210 can include the BM0 tracks 1182 and 1184 further extending thereto along the X-direction, respectively. Similarly, one of the source/drain terminals of the fifth portion of the WL transistor 350 is in electrical connection with the BM0 track 1182 through a backside via structure (VB) formed by a pattern 1232, with the other source/drain terminal of the fifth portion of the WL transistor 350 connected to the first portion of the CG transistor 380; and one of the source/drain terminals of the sixth portion of the WL transistor 350 is in electrical connection with the BM0 track 1184 through another backside via structure (VB) formed by a pattern 1234, with the other source/drain terminal of the sixth portion of the WL transistor 350 connected to the second portion of the CG transistor 380.

Figure 13:
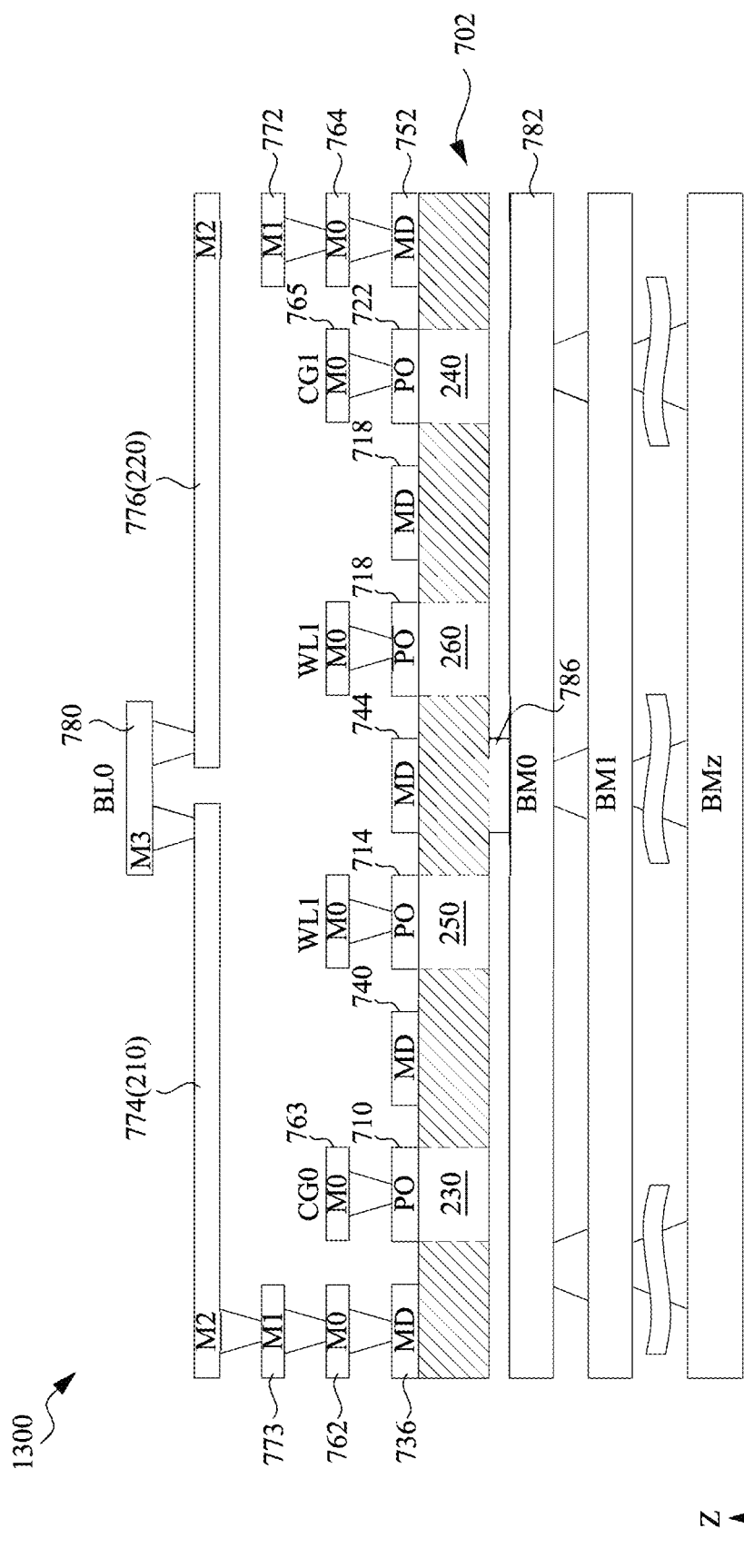
FIG. 13 illustrates a cross-sectional view of a semiconductor device including one memory cell formed based on the layout of FIG. 7, in accordance with some embodiments.

FIG. 13 illustrates a cross-sectional view of a semiconductor device 1300 that is formed according to the layout 700 of FIG. 7, in accordance with some embodiments. It should be noted that the cross-sectional view shown in FIG. 13 includes multiple cross-sections of the semiconductor device 1300, each of which is cut in parallel with the X-direction. Accordingly, a number of structures in parallel with each other (e.g., 762 and 763, 764 and 765, etc.) may be concurrently shown in the cross-sectional view of FIG. 13. Some of the references of FIG. 7 will be reused in the following discussion of the semiconductor device 1300.

As shown, in the active region 702, a number of channels and epitaxial structures can be formed. Each of the channels can be overlaid or wrapped by a corresponding one of the gate structures (e.g., 710, 714, 718, 722), and each of the epitaxial structures can be overlaid by a corresponding one of the MDs (e.g., 736, 740, 744, 748, 752). As discussed above, at least some respective portions of the CG transistors 230-240 and the WL transistors 250-260 can be formed by the active regions 702 and the gate structures 710, 714, 718, and 722. Further, the gate structure 710 can function as a part of the $CG_0$, the gate structures 714 and 718 can each function as a part of the $WL_1$, and the gate structure 722 can function as a part of the $CG_1$. Accordingly, each of the gate structures 710, 714, 718, and 722 can be coupled to one or more metal tracks formed thereupon.

For example, the gate structure 710 is coupled to the M0 track 763, and the gate structure 722 is coupled to the M0 track 765. Similarly, the MD 736, together with at least the M0 track 762, and M1 track 773, can couple one of the source/drain terminals (e.g., an epitaxial structure) of the CG transistor 230 to one end of the M2 track 774 that functions as the fuse resistor 210; and the MD 752, together with at least the M0 track 764, and M1 track 772, can couple one of the source/drain terminals (e.g., an epitaxial structure) of the CG transistor 240 to one end of the M2 track 776 that functions as the fuse resistor 220. The other end of the M2 track 774 is coupled to the M3 track 780 that functions as a part of the $BL_0$; and the other end of the M2 track 776 is coupled to the M3 track 780 (a part of the $BL_0$).

Further, the BM0 track 782 is formed on the second (e.g., back) side of a substrate opposite to the first (e.g., front) side of the substrate where the transistors 230 to 260 are formed. As shown, the BM0 track 782 is coupled to the common source/drain terminal (e.g., an epitaxial structure) of the WL transistors 250-260 through the VB 786. Such a common source/drain terminal may have its frontside and backside connected to the MD 744 and the VB 786, respectively. Over the BM0 layer (when flipping the substrate upside-down), a number of additional backside metallization layers, e.g., BM1 . . . BMz, can be formed. Each of the backside metallization layers can include one or more metal tracks similar to the BM0 track 782.

Figure 14:
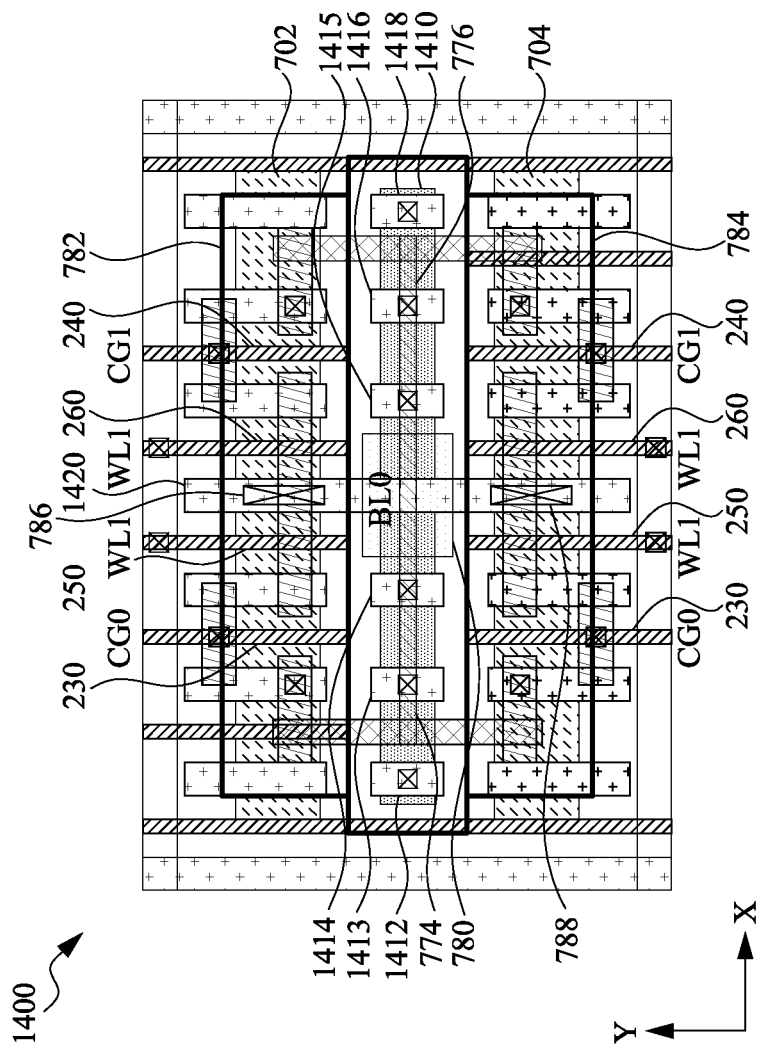
FIG. 14 illustrates a layout configured to form one memory cell based on the schematic of FIG. 2, in accordance with some embodiments.
Figure 15:
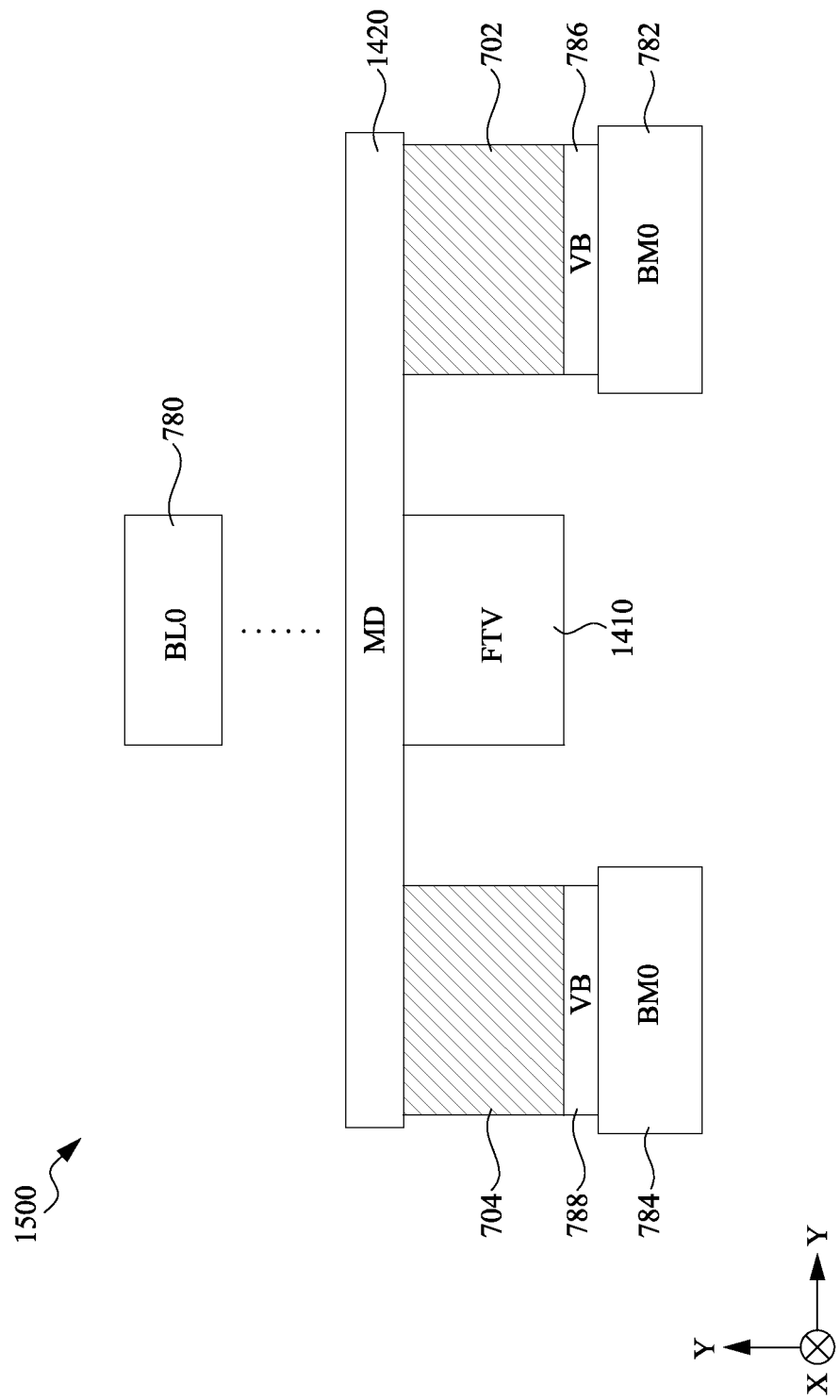
FIG. 15 illustrates a cross-sectional view of a semiconductor device including one memory cell formed by the layout of FIG. 14, in accordance with some embodiments.

FIG. 15 illustrates a cross-sectional view of a semiconductor device 1500 that is formed based on a layout 1400 of FIG. 14, in accordance with some embodiments. The layout 1400 is substantially similar to the layout 700 of FIG. 7, except that the layout 1400 includes at least one pattern configured to form a feed-through-via (FTV) structure. The cross-sectional view of FIG. 15 is cut along the Y-direction, e.g., along the lengthwise direction of one MD traversing the adjacent active regions 702-704. As the layout 1400 is similar to the layout 700 of FIG. 7, some of the references of FIG. 7 will be reused in the following discussion of the semiconductor device 1500 (and the corresponding layout 1400).

As shown in FIGS. 14-15, the layout 1400 includes a pattern 1410 configured to form an FTV structure (herein referred to as "FTV 1410"). The FTV 1410 can extend in parallel with and interposed between the active regions 702 and 704. The FTV 1410 may be different from the VB 786/788. For example, the FTV 1410 may fully extend through the substrate, while the VB 786/788 may partially extend into the substrate to connect to the backside of an epitaxial structure with a lower portion formed in the substrate. In such an embodiment where an FTV structure is formed between the active regions, a number of MDs (formed by respective patterns 1412, 1413, 1414, 1415, 1416, 1417, and 1418) can be formed on the frontside of the substrate, and in electrical connection with the FTV 1410. Further, the layout 1400 may include a pattern 1420 configured to form an MD that is formed on the frontside of the substrate and continuously extends across the active regions 702 and 704.

Figure 16:
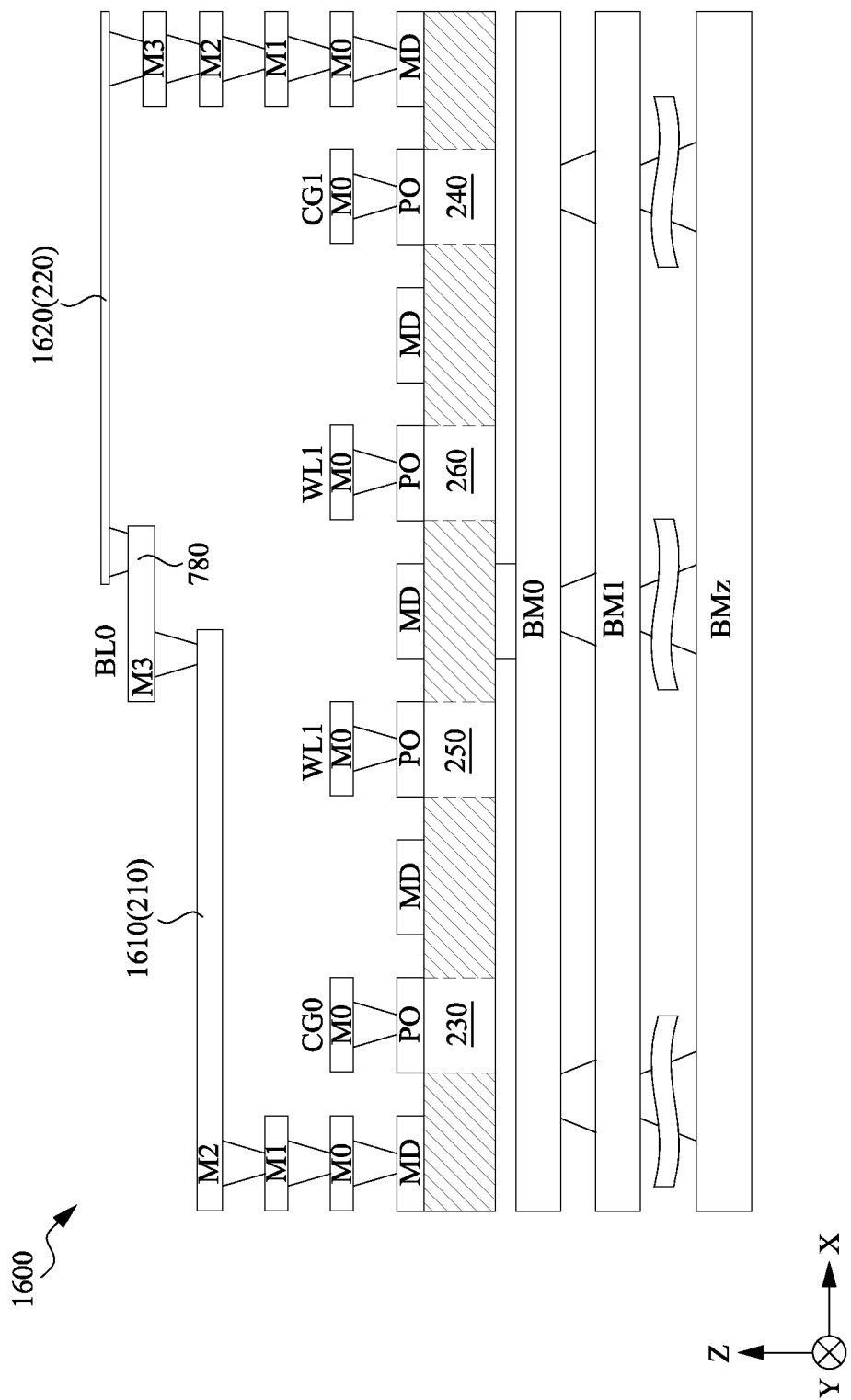
FIGS. 16, 17, and 18 respectively illustrate cross-sectional views of other semiconductor devices each including one memory cell shown in FIG. 2, in accordance with some embodiments.
Figure 17:
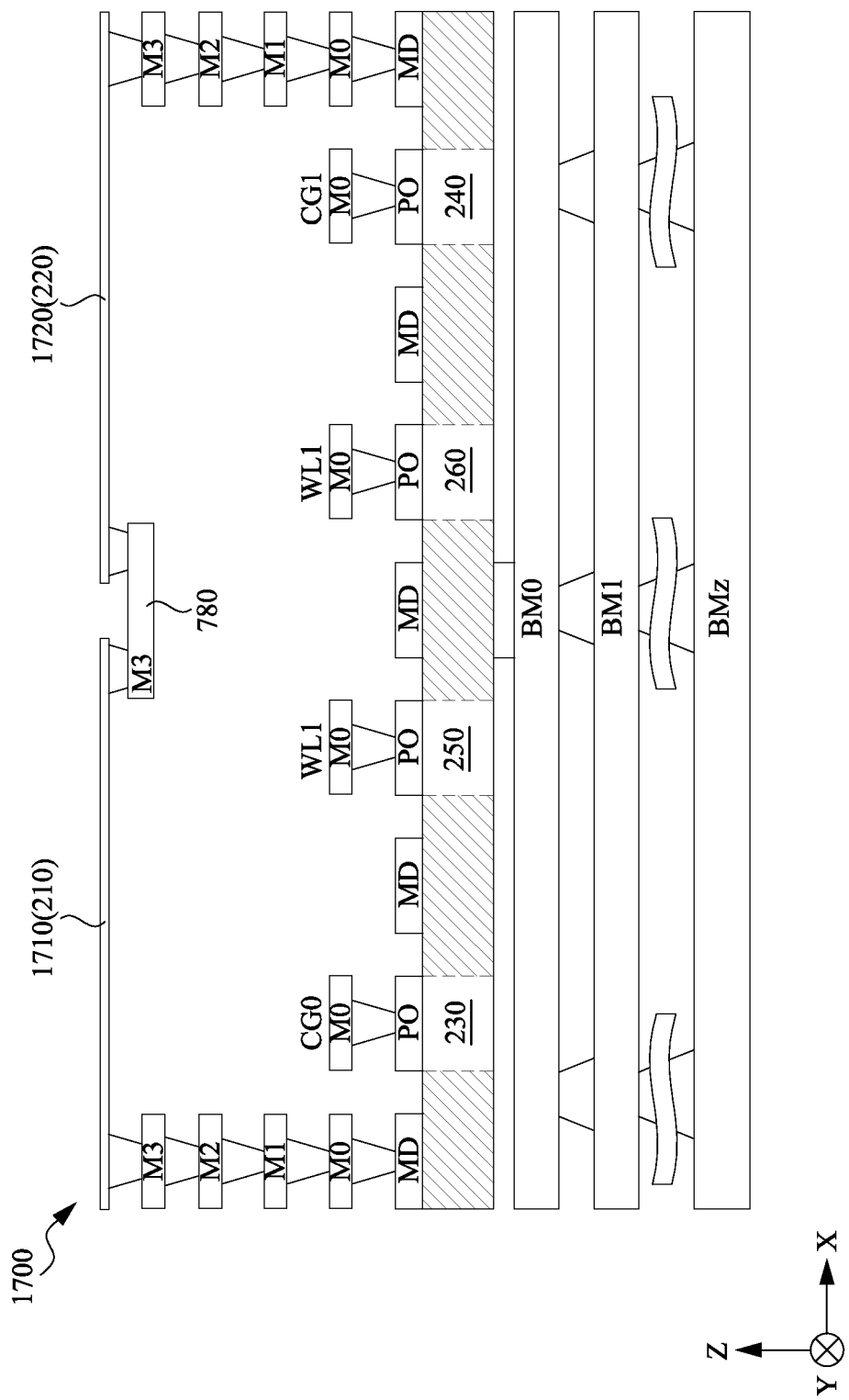
Figure 18:
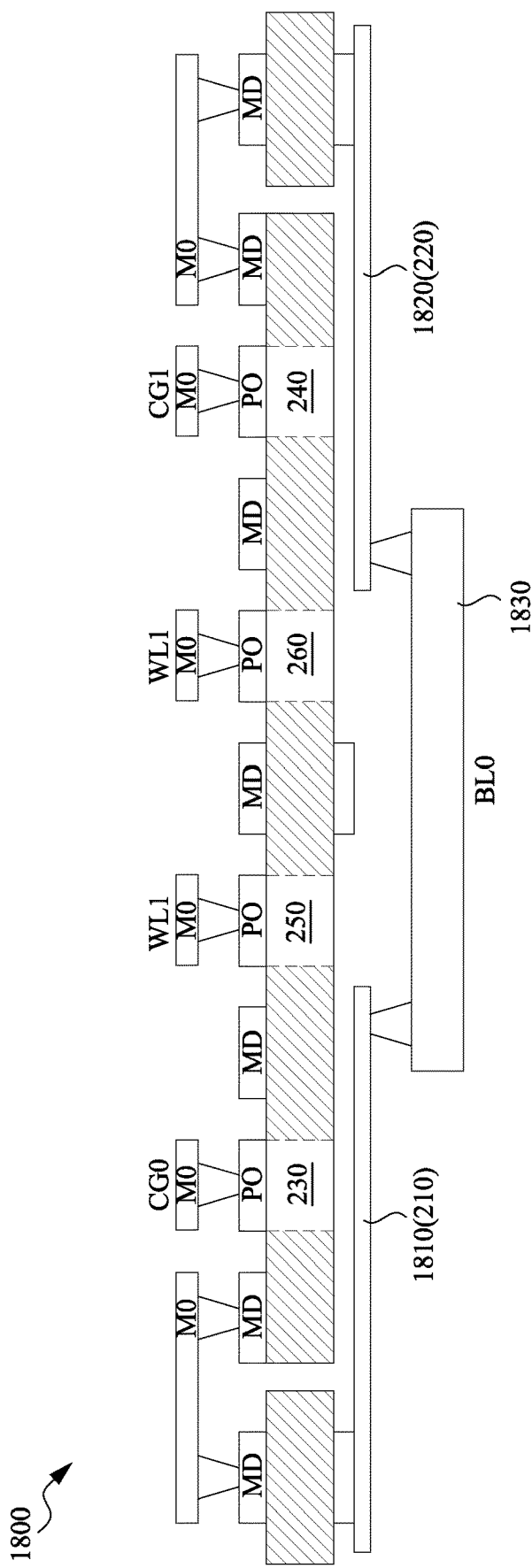

FIGS. 16, 17, and 18 illustrate respective cross-sectional views of semiconductor devices 1600, 1700, and 1800 that are each formed based on the layout 700 of FIG. 7, in accordance with some embodiments. It should be noted that the cross-sectional views shown in FIGS. 16-18 each include multiple cross-sections of the corresponding semiconductor device, each of which is cut in parallel with the X-direction. Accordingly, a number of structures in parallel with each other may be concurrently shown in each of the cross-sectional views of FIGS. 16-18. Some of the references of FIG. 7 will be reused in the following discussion of the semiconductor devices 1600 to 1800.

In FIG. 16, the semiconductor device 1600 includes one M2 track 1610 and one M4 track 1620 that operatively serve as the fuse resistor 210 and the fuse resistor 220, respectively. The M2 track 1610 and M4 track 1620 each have one end connected to each other through the M3 track 780 that can operative serve as a part of the $BL_0$. In FIG. 17, the semiconductor device 1700 includes a first M4 track 1710 and a second M4 track 1720 that operatively serve as the fuse resistor 210 and the fuse resistor 220, respectively. The M4 track 1710 and M4 track 1720 each have one end connected to each other through the M3 track 780 that can operative serve as a part of the $BL_0$. In FIG. 18, the semiconductor device 1800 includes a first BM0 track 1810 and a second BM0 track 1820 that operatively serve as the fuse resistor 210 and the fuse resistor 220, respectively. The BM0 track 1810 and BM0 track 1820 each have one end connected to each other through a BM1 track 1830 that can operative serve as a part of the $BL_0$.

Figure 19:
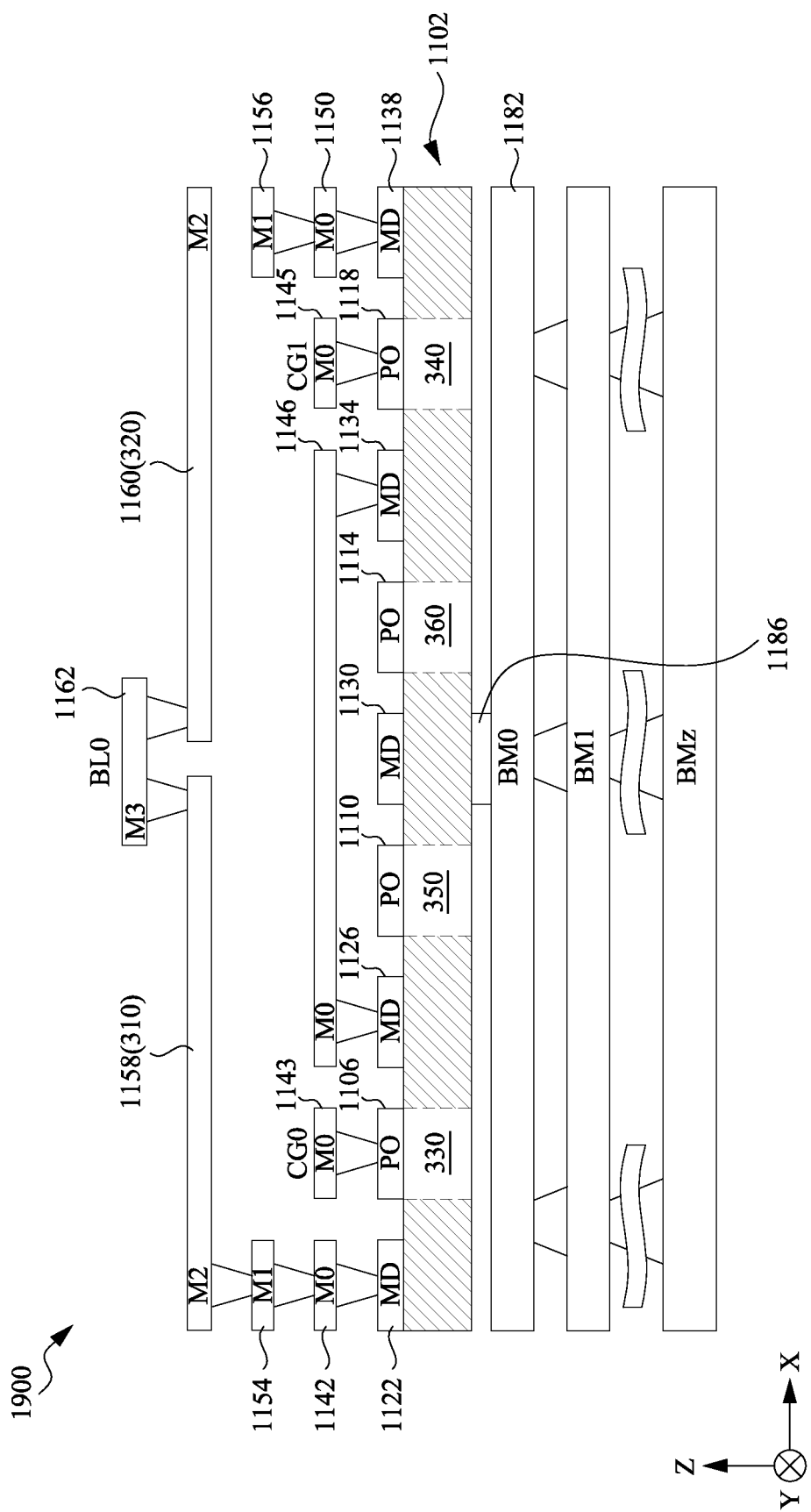
FIG. 19 illustrates a cross-sectional view of a semiconductor device including one memory cell formed based on the layout of FIG. 11, in accordance with some embodiments.

FIG. 19 illustrates a cross-sectional view of a semiconductor device 1900 that is formed according to the layout 1100 of FIG. 11, in accordance with some embodiments. It should be noted that the cross-sectional view shown in FIG. 19 includes multiple cross-sections of the semiconductor device 1900, each of which is cut in parallel with the X-direction. Accordingly, a number of structures in parallel with each other (e.g., 762 and 763, 764 and 765, etc.) may be concurrently shown in the cross-sectional view of FIG. 19. Some of the references of FIG. 11 will be reused in the following discussion of the semiconductor device 1900.

As shown, in the active region 1102, a number of channels and epitaxial structures can be formed. Each of the channels can be overlaid or wrapped by a corresponding one of the gate structures (e.g., 1106, 1110, 1114, 1118), and each of the epitaxial structures can be overlaid by a corresponding one of the MDs (e.g., 1122, 1126, 1130, 1134, 1138). As discussed above, at least some respective portions of the CG transistors 330-340 and the WL transistor 350 can be formed by the active regions 1102 and the gate structures 1106, 1110, 1114, 1118. Further, the gate structure 1106 can function as a part of the $CG_0$, the gate structures 1110 and 1114 can each function as a part of the $WL_1$, and the gate structure 1118 can function as a part of the $CG_1$. Accordingly, each of the gate structures 1106, 1110, 1114, 1118 can be coupled to one or more metal tracks formed thereupon.

For example, the gate structure 1106 is coupled to the M0 track 1143, and the gate structure 1118 is coupled to the M0 track 1145. Similarly, the MD 1122, together with at least the M0 track 1142, and M1 track 1154, can couple one of the source/drain terminals (e.g., an epitaxial structure) of the CG transistor 330 to one end of the M2 track 1158 that functions as the fuse resistor 310; and the MD 1138, together with at least the M0 track 1150, and M1 track 1156, can couple one of the source/drain terminals (e.g., an epitaxial structure) of the CG transistor 340 to one end of the M2 track 1160 that functions as the fuse resistor 320. Further, the M0 track 1146 can couple the MD 1126 to the MD 1134, in which the MD 1126 is commonly connected to the source/drain terminals of the CG transistor 330 and the WL transistor 350, and the MD 1134 is commonly connected to the source/drain terminals of the CG transistor 340 and the WL transistor 350. The other end of the M2 track 1158 is coupled to the M3 track 1162 that functions as a part of the $BL_0$; and the other end of the M2 track 1160 is coupled to the M3 track 1162 (a part of the $BL_0$).

Further, the BM0 track 1182 is formed on the second (e.g., back) side of a substrate opposite to the first (e.g., front) side of the substrate where the transistors 330 to 350 are formed. As shown, the BM0 track 1182 is coupled to the source/drain terminal (e.g., an epitaxial structure) of the WL transistor 350 through the VB 1186. Such a source/drain terminal may have its frontside and backside connected to the MD 1130 and the VB 1186, respectively. Over the BM0 layer (when flipping the substrate upside-down), a number of additional backside metallization layers, e.g., BM1 . . . BMz, can be formed. Each of the backside metallization layers can include one or more metal tracks similar to the BM0 track 1182.

Figure 20:
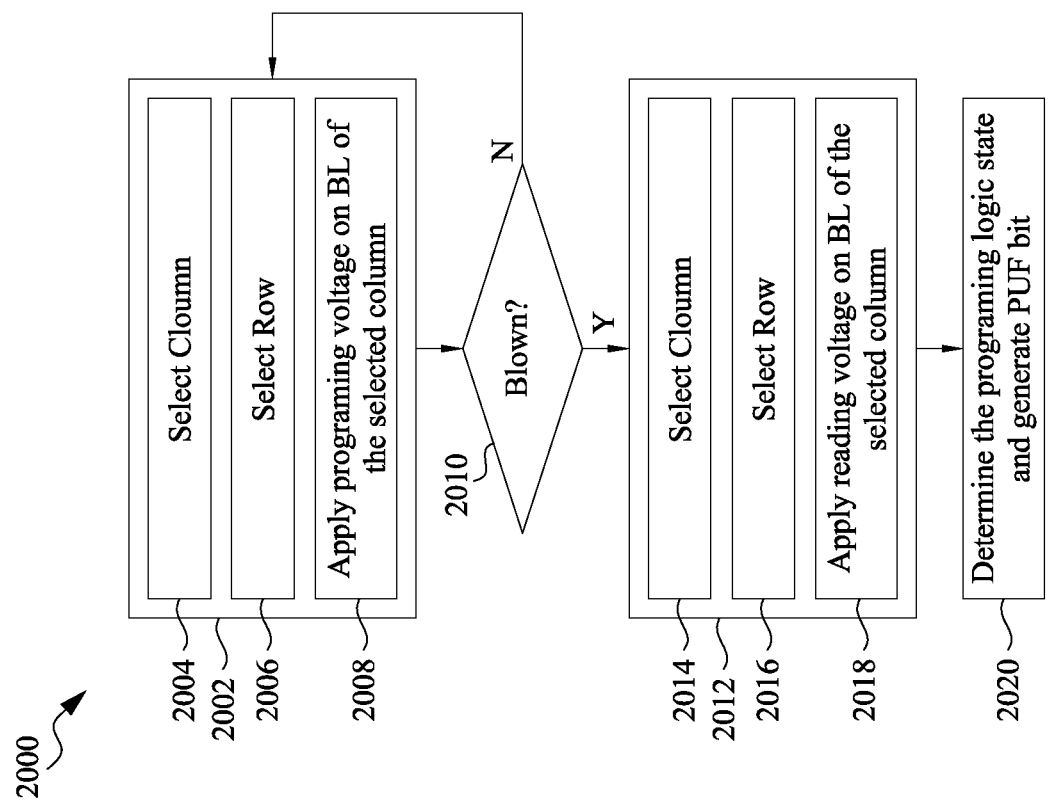
FIG. 20 illustrates a flow chart of an example method for generating a PUF bit based on the memory array of FIG. 1, in accordance with some embodiments.

FIG. 20 illustrates a flow chart of an example method 2000 for generating a physically unclonable function (PUF) signature based on an efuse memory cell including a pair of fuse resistors and multiple CG/WL transistors, in accordance with various embodiments. Operations of method 2000 are performed by at least the components illustrated in FIGS. 1-6. For purposes of discussion, the following embodiment of the method 2000 will be described in conjunction with FIGS. 1-6. The illustrated embodiment of the method 2000 is merely an example so that any of a variety of operations may be omitted, re-sequenced, and/or added, while remaining within the scope of the present disclosure.

The method 2000 may start with operation 2002 of a programing process. In some embodiments, operation 2002 can include operation 2004 in which a column is selected, operation 2006 in which a row is selected, and operation 2008 in which a programming voltage is applied on a BL of the selected column. It should be noted the sequence of operations 2004 to 2008 can be changed, while remaining within the scope of present disclosure. For example, operations 2004 and 2006 may be switched.

Referring first to operation 2004, the control logic circuit 112 can provide a column address for the column decoder 106 to select one of the columns $C_1$ to $C_N$ of the memory array 102. In some embodiments, the column address used during the programming process may not specify which of the CG lines to be selected. Stated another way, the column decoder 106 may assert both of the CG lines and the BL of the selected column. Upon selecting a column, the I/O circuit 108 can provide a voltage (e.g., corresponding to a logic high state when the CG transistor is an n-type transistor) to each of the CG lines arranged in the selected column, e.g., $CG_0$ and $CG_1$ of FIG. 2. As such, the CG transistors 230 and 240 can be turned on.

Next, in operation 2006, the control logic circuit 112 can provide a row address for the row decoder 104 to select one of the rows $R_1$ to $R_M$ of the memory array 102. In some embodiments, the row address may specify which of the WLs to be selected. Upon selecting a row, the I/O circuit 108 can provide a voltage (e.g., corresponding to a logic high state when the WL transistor is an n-type transistor) to the WL arranged in the selected row, e.g., $WL_0$ of FIG. 2. As such, the WL transistors 250 and 260 can be turned on. As such, the memory cell arranged in the intersection of the selected column and row (e.g., 103A) can be programmed.

Next, in operation 2008, the programming voltage is applied on the BL of the selected column, e.g., $BL_0$ of FIG. 2. By turning on the CG transistors 230-240 and the WL transistors 250-260, two conduction paths, one of which extends from the $BL_0$, through the fuse resistor 210, CG transistor 230 and WL transistor 250, and to ground, and the other of which extends from the $BL_0$, through the fuse resistor 220, CG transistor 240 and WL transistor 260, and to ground, can be formed. As such, the programming voltage, applied on the $BL_0$, can randomly blow one of the fuse resistor 210 or the fuse resistor 220.

Next, the method 2000 may proceed to operation 2010 to determine whether or not one of the fuse resistors of the selected memory cell has been blown (i.e., programmed). If so, the method 2000 may proceed to operation 2012 including one or more reading processes; and if not, the method 2000 may route back to operation 2002 to perform the programing process again. In various embodiments, the I/O circuit 108 can determine whether one of the fuse resistors has been blown based on detecting a voltage decrease present on the selected BL (e.g., $BL_0$), as discussed above.

In some embodiments, operation 2012 can include operation 2014 in which a column is selected, operation 2016 in which a row is selected, operation 2018 in which a reading voltage is applied on a BL of the selected column. It should be noted the sequence of operations 2014 to 2018 can be changed, while remaining within the scope of present disclosure. For example, operations 2014 and 2016 may be switched.

Referring first to operation 2014, the control logic circuit 112 can provide a column address for the column decoder 106 to select one of the columns $C_1$ to $C_N$ of the memory array 102. In some embodiments, the column address used during the reading process may specify which of the CG lines to be selected. Stated another way, the column decoder 106 may assert only one of the CG lines and the BL of the selected column. Upon selecting a column, the I/O circuit 108 can provide a voltage (e.g., corresponding to a logic high state when the CG transistor is an n-type transistor) to the CG line arranged in the selected column, e.g., $CG_0$ of FIG. 2. As such, the CG transistor 230 can be turned on, while the other CG transistor 240 may be turned off.

Next, in operation 2016, the control logic circuit 112 can provide a row address for the row decoder 104 to select one of the rows $R_1$ to $R_M$ of the memory array 102. In some embodiments, the row address may specify which of the WLs to be selected. Upon selecting a row, the I/O circuit 108 can provide a voltage (e.g., corresponding to a logic high state when the WL transistor is an n-type transistor) to the WL arranged in the selected row, e.g., $WL_0$ of FIG. 2. As such, the WL transistors 250 and 260 can be turned on. As such, the memory cell arranged in the intersection of the selected column and row (e.g., 103A) can be read.

Next, in operation 2018, the reading voltage is applied on the BL of the selected column, e.g., $BL_0$ of FIG. 2. By turning on the CG transistor 230 and the WL transistors 250-260, one conduction path, which extends from the $BL_0$, through the fuse resistor 210, CG transistor 230 and WL transistor 250, and to ground, can become available pending whether the fuse resistor 210 has been randomly blown. For example, the reading voltage, applied on the $BL_0$, can generate current flowing through the conduction path if the fuse resistor 210 remains intact (not blown). In other words, a short circuit forms (or remains) from the $BL_0$, through the fuse resistor 210, CG transistor 230 and WL transistor 250, and to ground. On the other hand, if the fuse resistor 210 has been blown, no current can be generated. In other word, an open circuit forms between the $BL_0$ and ground.

The method 2000 may continue to operation 2020 in which a logic state programmed into the memory cell is determined, and a bit of a PUF signature is generated based on the determined logic state. For example, the control logic circuit 112 can determine the logic state programmed into the memory cell 103A based on the reading process 2012, e.g., whether the current is present on the $BL_0$. If the current or a sufficiently high current level is detected (e.g., by the I/O circuit 108), the control logic circuit 112 can determine that the memory cell 103A (or specifically, the fuse resistor connected to the selected CG transistor) has not been blown and in turn determine the programmed logic state as logic 0. If the current is not detected or a sufficiently low current level is detected (e.g., by the I/O circuit 108), the control logic circuit 112 can determine that the memory cell 103A (or specifically, the fuse resistor connected to the selected CG transistor) has been blown and in turn determine the programmed logic state as a logic 1. Next, the control logic circuit 112 can provide the determined logic state to the authentication circuit 110 to generate a PUF bit. Since the logic state is randomly determined based on the process variations of the pair of fuse resistors, the logic state (i.e., the PUF bit) can be randomly generated, which advantageously increases security of the memory system 100.

Figure 21:
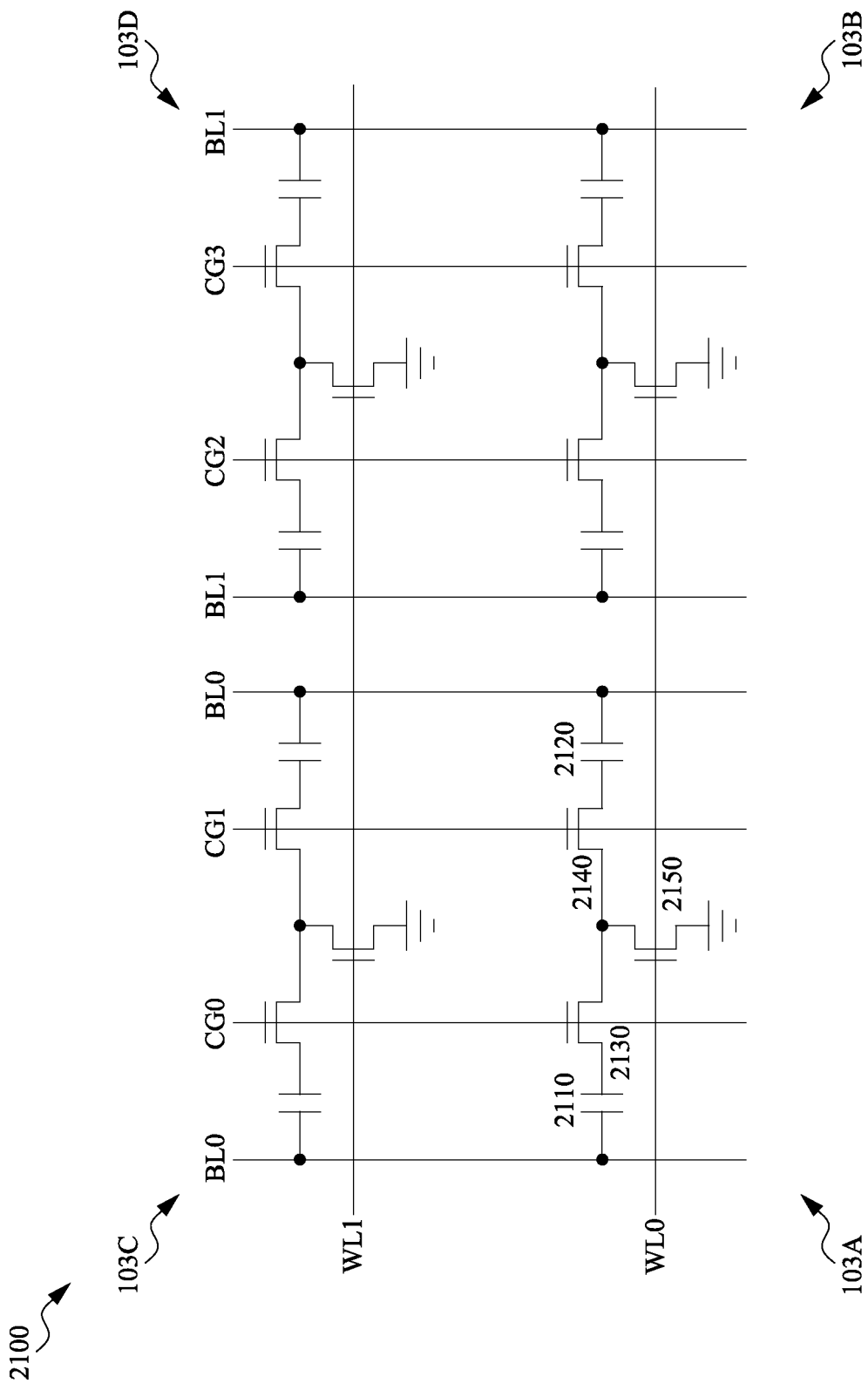
FIG. 21 illustrates yet another example schematic diagram of a portion of the memory array of FIG. 1 that include a number of memory cells, in accordance with some embodiments.

FIG. 21 illustrates an example schematic diagram 2100 of a portion of the memory device 100 (e.g., some of the memory cells 103), in accordance with some embodiments. In the illustrated examples of FIG. 21, efuse memory cells 103A, 103B, 103C, and 103D of the memory array 102 are shown. Different from the schematic diagrams 200 (FIG. 2) and 300 (FIG. 3) discussed above, each of the efuse memory cells 103A-D includes two fuse capacitors. Although four efuse memory cells 103A-D are shown, it should be appreciated that the memory array 102 can have any number of similar efuse memory cells, while remaining within the scope of present disclosure.

As the schematic diagram 2100 is similar to the schematic diagram 300 except for the fuse components, the following discussion will be focused on the difference. In the illustrative embodiment of FIG. 21, the efuse memory cells 103 (e.g., 103A) can each include a first fuse capacitor 2110, a second fuse capacitor 2120, a first CG transistor 2130, a second CG transistor 2140, and a common WL transistor 2150. The first CG transistor 2130 and the second CG transistor 2140 have their first source/drain terminals coupled to ground through the WL transistor 2150. The first CG transistor 2130 and the second CG transistor 2120 have their second source/drain terminals coupled to the $BL_0$ through the fuse capacitor 2110 and the fuse capacitor 2120, respectively.

Figure 22:
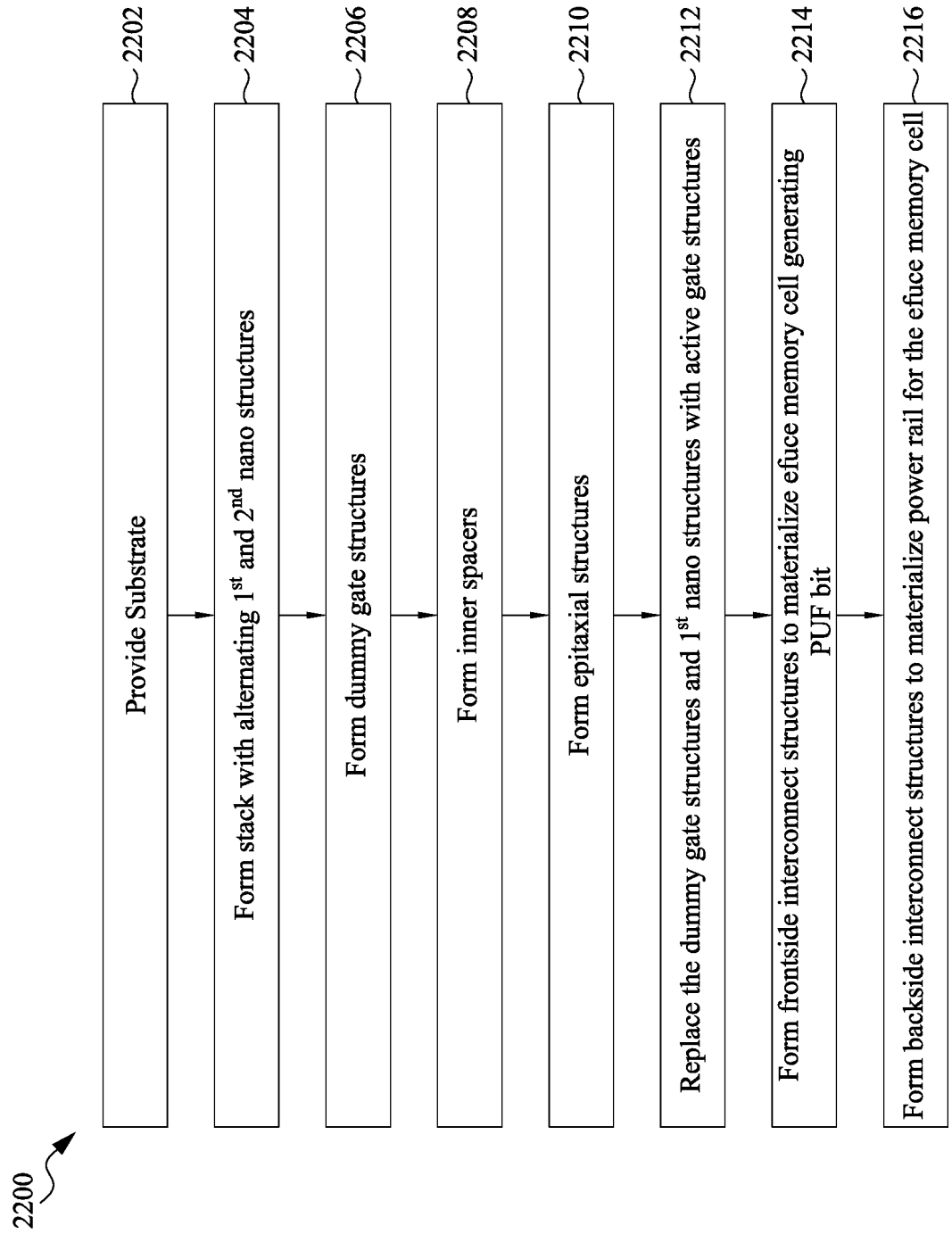
FIG. 22 illustrates a flow chart of an example method for fabricating a semiconductor device, in accordance with some embodiments.

FIG. 22 illustrates a flowchart of an example method 2200 to form a portion of the above-described semiconductor device (e.g., 1300 of FIG. 13, 1900 of FIG. 19), according to one or more embodiments of the present disclosure. For example, the method 2200 can be performed to form a semiconductor device according to the layout 700 or 1100. In one aspect, the method 2200 includes operations to fabricate an efuse memory cell consisting of multiple CG transistors, one or more WL transistors, and multiple fuse resistors. It is noted that the method 2200 is merely an example and is not intended to limit the present disclosure. Accordingly, it is understood that additional operations may be provided before, during, and after the method 2200 of FIG. 22, and that some other operations may only be briefly described herein.

The method 2200 starts with operation 2202 in which a substrate is provided, in accordance with various embodiments. The substrate includes a semiconductor material substrate, for example, silicon. Alternatively, the substrate may include other elementary semiconductor material such as, for example, germanium. The substrate may also include a compound semiconductor such as silicon carbide, gallium arsenic, indium arsenide, and indium phosphide. The substrate may include an alloy semiconductor such as silicon germanium, silicon germanium carbide, gallium arsenic phosphide, and gallium indium phosphide. In one embodiment, the substrate includes an epitaxial layer. For example, the substrate may have an epitaxial layer overlying a bulk semiconductor. Furthermore, the substrate may include a semiconductor-on-insulator (SOI) structure. For example, the substrate may include a buried oxide (BOX) layer formed by a process such as separation by implanted oxygen (SIMOX) or other suitable technique, such as wafer bonding and grinding.

The method 2200 proceeds to operation 2204 in which a stack, including an alternating series of first nanostructures and second nanostructures, is formed, in accordance with various embodiments. Such a stack can be formed based on one of the (active region) patterns discussed above. The stack can be formed in a frontside of the substrate. In some embodiments, the first nanostructures may include SiGe sacrificial nanostructures, and the second nanostructures may include Si channel nanostructures. Such a stack may sometimes be referred to as a superlattice. In a non-limiting example, the SiGe sacrificial nanostructures can be SiGe 25%. The notation "SiGe 25%" is used to indicate that 25% of the SiGe material is Ge. It is understood the percentage of Ge in each of the SiGe sacrificial nanostructures can be any value between 0 and 100 (excluding 0 and 100), while remaining within the scope of present disclosure. In some other embodiments, the second nanostructures may include a first semiconductor material other than Si and the first nanostructures may include a second semiconductor material other than SiGe, as long as the first and second semiconductor materials are respectively characterized with different etching properties (e.g., etching rates).

The alternating series of nanostructures can be formed by epitaxially growing one layer and then the next until the desired number and desired thicknesses of the nanostructures are achieved. Epitaxial materials can be grown from gaseous or liquid precursors. Epitaxial materials can be grown using vapor-phase epitaxy (VPE), molecular-beam epitaxy (MBE), liquid-phase epitaxy (LPE), or other suitable process. Epitaxial silicon, silicon germanium, and/or carbon doped silicon (Si:C) silicon can be doped during deposition (in-situ doped) by adding dopants, n-type dopants (e.g., phosphorus or arsenic) or p-type dopants (e.g., boron or gallium), depending on the type of transistor.

The method 2200 proceeds to operation 2206 in which a number of dummy gate structures are formed, in accordance with various embodiments. Such a dummy gate structure can be formed based on one of the (gate structure) patterns discussed above. The dummy gate structure can extend along a direction perpendicular to the lengthwise direction of the dielectric fin structure (and the stack). Further, the dummy gate structure may be formed shorter than the dielectric fin structure in one of various embodiments, and thus, the dummy gate structure, as formed, is cut (or otherwise separated) by the dielectric fin structure.

The dummy gate structure can be formed by depositing amorphous silicon (a-Si) over the stack. Other materials suitable for forming dummy gates (e.g., polysilicon) can be used while remaining within the scope of present disclosure. The a-Si is then planarized to a desired level. A hard mask is deposited over the planarized a-Si and patterned. The hard mask can be formed from a nitride or an oxide layer. An etching process (e.g., a reactive-ion etching (RIE) process) is applied to the a-Si to form the dummy gate structure. After forming the dummy gate structure, gate spacers may be formed to extend along sidewalls of the dummy gate structure. The gate spacers can be formed by a conformal deposition of a dielectric material (e.g., silicon oxide, silicon nitride, silicon oxynitride, SiBCN, SiOCN, SiOC, or any suitable combination of those materials) followed by a directional etch (e.g., RIE).

The method 2200 proceeds to operation 2208 in which inner spacers are formed by replacing end portions of each of the SiGe sacrificial nanostructures with a dielectric material, in accordance with various embodiments. Upon forming the dummy gate structure overlaying certain portions of the stack (e.g., the portions of the stack separated by the dielectric fin structure), the non-overlaid portions of the stack are removed. Next, respective end portions of each SiGe sacrificial nanostructure of the overlaid stack are removed. The inner spacers are formed by filling such recesses of each SiGe sacrificial nanostructure with a dielectric material by chemical vapor deposition (CVD), or by monolayer doping (MILD) of nitride followed by spacer RIE. A material of the inner spacers can be formed from the same or different material as the gate spacers described above. For example, the inner spacers can be formed of silicon nitride, silicoboron carbonitride, silicon carbonitride, silicon carbon oxynitride, or any other type of dielectric material (e.g., a dielectric material having a dielectric constant k of less than about 5).

The method 2200 proceeds to operation 2210 in which a number of epitaxial structures are formed, in accordance with various embodiments. Upon forming the inner spacers, the epitaxial structures are formed using an epitaxial layer growth process on exposed ends of the Si nanostructures. I n-situ doping (ISD) may be applied to form doped epitaxial structures, thereby creating the necessary junctions for a corresponding transistor (or sub-transistor). N-type and p-type FETs are formed by implanting different types of dopants to selected regions of the device to form the necessary junction(s). N-type devices can be formed by implanting arsenic (As) or phosphorous (P), and p-type devices can be formed by implanting boron (B). After forming the epitaxial structures, an inter-layer dielectric (e.g., silicon dioxide) is deposited to overlay the epitaxial structures.

The method 2200 proceeds to operation 2212 in which the dummy gate structures and the remaining SiGe sacrificial nanostructures are replaced with respective active gate structures, in accordance with various embodiments. Subsequently to forming the inter-layer dielectric, the dummy gate structures are removed by an etching process, e.g., RIE or chemical oxide removal (COR). Next, the remaining SiGe sacrificial nanostructures are removed while keeping the Si channel nanostructure substantially intact by applying a selective etch (e.g., a hydrochloric acid (HCl)). After the removal of the SiGe sacrificial nanostructures, top and bottom surfaces and sidewalls of each of the Si channel nanostructures can be exposed, except for the sidewall in contact with the dielectric fin structure. Next, a number of active gate structures can be formed to wrap around each of the Si channel nanostructures, except for the sidewall contacting the dielectric fin structure. Each of the active gate structures includes at least a gate dielectric layer (e.g., a high-k dielectric layer) and a gate metal layer (e.g., a work function metal layer). Upon the active gate structures are formed, at least two CG transistors (e.g., 230 and 240, 330 and 340) and one WL transistor (250 and 260, 350) of the disclosed efuse memory cell can be formed.

The method 2200 proceeds to operation 2214 in which a number of frontside interconnect structures are formed to materialize an efuse memory cell that can generate a PUF bit, in accordance with various embodiments. Upon forming the CG/WL transistors, a number of middle-end interconnect structures (e.g., VGs, VDs, MDs) are formed over the transistors. For example, a number of VGs can be formed to connect to gate terminals of the CG transistors and WL transistor(s), respectively, and a number of MDs can be formed to connect to source/drain terminals of the CG transistors and WL transistor(s), respectively. Further, a number of back-end metal tracks (e.g., M0 tracks, M1 tracks, M2 tracks, etc.) can be formed over the middle-end interconnect structures. In some embodiments, fuse resistors (e.g., 210 and 220, 310 and 320) of the disclosed efuse memory cell can each be formed as one of these back-end metal tracks.

The frontside interconnect structure is formed of a metal material. The metal material can be selected from the group consisting of aluminum, tungsten, tungsten nitride, copper, cobalt, silver, gold, chrome, ruthenium, platinum, titanium, titanium nitride, tantalum, tantalum nitride, nickel, hafnium, and combinations thereof. Other metal materials are within the scope of the present disclosure. The frontside interconnect structures can be formed by overlaying the frontside of the substrate with the above-listed metal material by, for example, chemical vapor deposition (CVD), physical vapor deposition (PVD), electroless plating, electroplating, or combinations thereof.

In some embodiments, the features formed through the operations 2202 to 2214 can be arranged according to the layout 700 (FIG. 7) to form one of the disclosed efuse memory cells that can operatively generate a PUF bit. For example, through the operation 2204, two stacks that correspond to the active regions 702 and 704, respectively, can be formed; through the operations 2206 and 2212, a number of gate structures that correspond to the gate structures 706 to 728, respectively, can be formed; and through operation 2210, a number of source/drain structures can be formed. As such, the transistors 230 to 260 (e.g., of the efuse memory cell 103C) can be formed. Following the formation of the transistors, through the operation 2214, the fuse resistors 210 and 220 corresponding to the metal tracks 774 and 776, respectively, together with other metal tracks (e.g., 780) connecting the transistors 230 to 260 to one another, can be formed. For example, the transistors 250 and 260 have their respective gate terminals commonly connected to the same $WL_1$. In another example, the gate terminals of the transistors 230 and 240 are connected to the $CG_0$ and $CG_1$, respectively. In yet another example, respective ends of the metal tracks 774 and 776 are connected to each other through the metal track 780, which corresponds to the $BL_0$.

In some embodiments, the features formed through the operations 2202 to 2214 can be arranged according to the layout 1100 (FIG. 11) to form one of the disclosed efuse memory cells that can operatively generate a PUF bit. For example, through the operation 2204, two stacks that correspond to the active regions 1102 and 1104, respectively, can be formed; through the operations 2206 and 2212, a number of gate structures that correspond to the gate structures 1106 to 1120, respectively, can be formed; and through operation 2210, a number of source/drain structures can be formed. As such, the transistors 330 to 350 (e.g., of the efuse memory cell 103C) can be formed. Following the formation of the transistors, through the operation 2214, the fuse resistors 310 and 320 corresponding to the metal tracks 1158 and 1160, respectively, together with other metal tracks (e.g., 1162) connecting the transistors 330 to 350 to one another, can be formed. For example, the transistor 350 has its gate terminal connected to the $WL_1$. In another example, the gate terminals of the transistors 330 and 340 are connected to the $CG_0$ and $CG_1$, respectively. In yet another example, respective ends of the metal tracks 1158 and 1160 are connected to each other through the metal track 1162, which corresponds to the $BL_0$.

The method 2200 proceeds to operation 2216 in which a number of backside interconnect structures are formed to materialize a power rail for the efuse memory cell, in accordance with various embodiments. Upon forming the frontside interconnect structures, the substrate may be flipped and a number of backside interconnect structures (e.g., BM0 tracks, BM1 tracks, VBs, FTVs, etc.) can be formed. In some embodiments, the disclosed efuse memory cell can include at least one power rail formed as one of these backside interconnect structures (e.g., 782, 1182).

The backside interconnect structure is formed of a metal material. The metal material can be selected from the group consisting of aluminum, tungsten, tungsten nitride, copper, cobalt, silver, gold, chrome, ruthenium, platinum, titanium, titanium nitride, tantalum, tantalum nitride, nickel, hafnium, and combinations thereof. Other metal materials are within the scope of the present disclosure. The backside interconnect structures can be formed by overlaying the backside of the substrate with the above-listed metal material by, for example, chemical vapor deposition (CVD), physical vapor deposition (PVD), electroless plating, electroplating, or combinations thereof.

In one aspect of the present disclosure, a memory device is disclosed. The memory device includes an array comprising a plurality of one-time-programmable (OTP) memory cells; a plurality of word lines (WLs); a plurality of bit lines (BLs); and a plurality of control gate (CG) lines. Each of the OTP memory cells comprises a first fuse resistor, a second fuse resistor, a first transistor, and a second transistor. The first fuse resistor and the second fuse resistor are coupled to a corresponding one of the BLs, while the first transistor and the second transistor are gated by a first one and a second one of the CG lines, respectively.

In another aspect of the present disclosure, a memory device is disclosed. The memory device includes a memory cell that comprises: a first fuse resistor; a second fuse resistor; a first transistor connected to the first fuse resistor in series; and a second transistor connected to the second fuse resistor in series. The memory cell is configured to randomly present a first logic state when the first fuse resistor is blown, or a second logic state when the second fuse resistor is blown.

In yet another aspect of the present disclosure, a method for forming a memory device is disclosed. The method includes forming at least, a first transistor, a second transistor, and a third transistor on a first side of a substrate. The method includes forming a first fuse resistor and a second fuse resistor in one of a plurality of first metallization layers that are disposed over the first to third transistors on the first side. The method includes forming a power rail in one of a plurality of second metallization layers that are disposed on a second side of the substrate opposite to the first side.

As used herein, the terms "about" and "approximately" generally indicates the value of a given quantity that can vary based on a particular technology node associated with the subject semiconductor device. Based on the particular technology node, the term "about" can indicate a value of a given quantity that varies within, for example, 10-30% of the value (e.g., ±10%, ±20%, or ±30% of the value).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
an array comprising a plurality of one-time-programmable (OTP) memory cells;
a plurality of word lines (WLs);
a plurality of bit lines (BLs); and
a plurality of control gate (CG) lines;
wherein each of the OTP memory cells comprises a first fuse resistor, a second fuse resistor, a first transistor, and a second transistor; and
wherein the first fuse resistor and the second fuse resistor are coupled to a corresponding one of the BLs, while the first transistor and the second transistor are gated by a first one and a second one of the CG lines, respectively.

2. The memory device of claim 1, wherein the OTP memory cells are arranged over plurality of columns and a plurality of rows, each of the rows including a corresponding one of the WLs, each of the columns including a corresponding one of the BLs and a corresponding pair of the CG lines.

3. The memory device of claim 1, wherein each of the OTP memory cells further comprises a third transistor and a fourth transistor, and wherein the third and fourth transistors are commonly gated by a corresponding one of the WLs.

4. The memory device of claim 3, wherein the first fuse resistor, the first transistor, and the third transistor are connected in series between the corresponding BL and a power rail that carries a supply voltage, and wherein the second fuse resistor, the second transistor, and the fourth transistor are connected in series between the corresponding BL and the power rail.

5. The memory device of claim 4, wherein the first to fourth transistors are formed along a frontside surface of a substrate, the first and second fuse resistors are formed in one of a plurality of metallization layers disposed over the frontside surface, and the power rail is formed over a backside surface of the substrate.

6. The memory device of claim 1, wherein each of the OTP memory cells further comprises a third transistor, and wherein the third transistor is gated by a corresponding one of the WLs.

7. The memory device of claim 6, wherein the first fuse resistor, the first transistor, and the third transistor are connected in series between the corresponding BL and a power rail that carries a supply voltage, and wherein the second fuse resistor, the second transistor, and the third transistor are also connected in series between the corresponding BL and the power rail.

8. The memory device of claim 7, wherein the first to third transistors are formed along a frontside surface of a substrate, the first and second fuse resistors are formed in one of a plurality of metallization layers disposed over the frontside surface, and the power rail is formed over a backside surface of the substrate.

9. The memory device of claim 1, wherein each of the OTP memory cells is configured to permanently present a logic state based on whether the first fuse resistor or the second fuse resistor is randomly blown.

10. The memory device of claim 9, wherein the logic state is identified based on activating one of the first transistor or the second transistor.

11. A memory device, comprising:
a memory cell that comprises:
a first fuse resistor;
a second fuse resistor;
a first transistor connected to the first fuse resistor in series; and a second transistor connected to the second fuse resistor in series;

wherein the memory cell is configured to randomly present a first logic state when the first fuse resistor is blown, or a second logic state when the second fuse resistor is blown.

12. The memory device of claim 11, wherein either the first logic state or the second logic state functions as a bit of a Physically Unclonable Function (PUF) signature.

13. The memory device of claim 11, wherein the memory cell further comprises:
   a third transistor connected to the first transistor in series; and
   a fourth transistor connected to the second transistor in series.

14. The memory device of claim 13, wherein the third and fourth transistors are concurrently activated and the first and second transistors are concurrently activated, when programming the memory cell to randomly blow the first fuse resistor or the second fuse resistor.

15. The memory device of claim 13, wherein the third and fourth transistors are concurrently activated and only one of the first or second transistors is activated, when reading the memory cell to identify the first or second logic state.

16. The memory device of claim 11, wherein the memory cell further comprises:
   a third transistor connected to each of the first transistor and the second transistor in series.

17. The memory device of claim 16, wherein the third transistor is activated and the first and second transistors are concurrently activated, when programming the memory cell to randomly blow the first fuse resistor or the second fuse resistor.

18. The memory device of claim 16, wherein the third transistor is activated and only one of the first or second transistors is activated, when reading the memory cell to identify the first or second logic state.

19. A method for forming a memory device, comprising:
   forming at least, a first transistor, a second transistor, and a third transistor on a first side of a substrate;
   forming a first fuse resistor and a second fuse resistor in one of a plurality of first metallization layers that are disposed over the first to third transistors on the first side; and
   forming a power rail in one of a plurality of second metallization layers that are disposed on a second side of the substrate opposite to the first side.

20. The method of claim 19, wherein the first to third transistors, the first to second fuse resistors, and the power rail collectively form an efuse memory cell that is configured to generate a bit of a Physically Unclonable Function (PUF) signature based on whether the first fuse resistor or the second fuse resistor has been blown.

* * * * *